US006963908B1

(12) United States Patent
Lynch et al.

(10) Patent No.: US 6,963,908 B1
(45) Date of Patent: Nov. 8, 2005

(54) SYSTEM FOR TRANSFERRING CUSTOMIZED HARDWARE AND SOFTWARE SETTINGS FROM ONE COMPUTER TO ANOTHER COMPUTER TO PROVIDE PERSONALIZED OPERATING ENVIRONMENTS

(75) Inventors: Gerard D. Lynch, Newburyport, MA (US); Dana Bruce Berenson, Bradford, MA (US); Andrew Shay Woodard, Raleigh, NC (US)

(73) Assignee: Symantec Corporation, Cupertino, CA (US)

( * ) Notice: Subject to any disclaimer, the term of this patent is extended or adjusted under 35 U.S.C. 154(b) by 640 days.

(21) Appl. No.: 09/709,505

(22) Filed: Nov. 13, 2000

Related U.S. Application Data

(60) Provisional application No. 60/192,860, filed on Mar. 29, 2000.

(51) Int. Cl.[7] .......................................... G06F 15/177
(52) U.S. Cl. ....................... 709/220; 709/221; 709/222
(58) Field of Search ............................. 709/220, 221, 709/226, 229, 222; 370/351; 358/500; 710/15; 719/313

(56) References Cited

U.S. PATENT DOCUMENTS

| | | | | |
|---|---|---|---|---|
| 5,845,282 | A | | 12/1998 | Alley et al. .................... 707/10 |
| 5,872,966 | A | * | 2/1999 | Burg .......................... 719/313 |
| 5,996,012 | A | * | 11/1999 | Jarriel ........................ 709/226 |
| 6,012,130 | A | | 1/2000 | Beyda et al. ................ 711/173 |
| 6,088,732 | A | * | 7/2000 | Smith et al. ................ 709/229 |
| 6,091,518 | A | * | 7/2000 | Anabuki ..................... 358/500 |
| 6,161,176 | A | | 12/2000 | Hunter et al. ................. 713/1 |
| 6,182,212 | B1 | | 1/2001 | Atkins et al. ................. 713/1 |
| 6,185,598 | B1 | | 2/2001 | Farber et al. ............... 709/200 |
| 6,202,206 | B1 | | 3/2001 | Dean et al. .................. 717/11 |

(Continued)

FOREIGN PATENT DOCUMENTS

EP           1 173 809 B1       4/2003

OTHER PUBLICATIONS

Box et al., *Simple Object Access Protocol (SOAP) 1.1*, W3C Note May 8, 2000, pp. 1-32.

Primary Examiner—Le Hien Luu
(74) Attorney, Agent, or Firm—Gunnison, McKay & Hodgson, L.L.P.

(57) ABSTRACT

A method and system for transferring information from a first computer-based device to a web site, for temporary storage and later transfer of the stored information from the web site to a second computer-based device. First, a communication link is established between a first computer-based device and the web site. Next, the first computer-based device is scanned, via the web site, to determine the information contained on the first computer-based device. The user then selects which of the scanned information is to be uploaded from the first computer-based device onto the web site for temporary storage. Finally, the selected information is transferred from the first computer-based device onto the web site for temporary storage. Once retrieval of the temporarily stored information is desired, the user establishes a communication link between a second computer-based device and the web site. The second computer-based device is scanned, via the web site, to determine the information contained on the second computer-based device. The temporarily stored information, from the first computer-based device on the web site, is then displayed to the user and the user selects which of this temporary information, from the first computer-based device, is to be downloaded from the web site onto the second computer-based device. The selected information is finally downloaded from the website onto the second computer-based device.

69 Claims, 30 Drawing Sheets

U.S. PATENT DOCUMENTS

| | | |
|---|---|---|
| 6,311,180 B1 | 10/2001 | Fogarty .......................... 707/4 |
| 6,336,124 B1 | 1/2002 | Alam et al. ................. 707/523 |
| 6,370,646 B1 | 4/2002 | Goodman et al. .......... 713/100 |
| 6,377,927 B1 | 4/2002 | Loghmani et al. .......... 704/275 |
| 6,477,565 B1 | 11/2002 | Daswani et al. ............ 709/217 |
| 6,546,002 B1 * | 4/2003 | Kim ........................... 370/351 |
| 6,556,217 B1 | 4/2003 | Makipaa et al. ............. 345/667 |
| 6,593,943 B1 | 7/2003 | MacPhail .................... 345/734 |
| 6,609,162 B1 * | 8/2003 | Shimizu et al. ............... 710/15 |
| 6,654,814 B1 | 11/2003 | Britton et al. .............. 709/246 |
| 6,735,691 B1 | 5/2004 | Capps et al. .................... 713/1 |
| 6,766,298 B1 | 7/2004 | Ravishankar et al. .... 704/270.1 |
| 2002/0104080 A1 | 8/2002 | Woodward et al. ......... 717/176 |
| 2002/0111972 A1 | 8/2002 | Lynch et al. ................ 707/523 |
| 2003/0159028 A1 | 8/2003 | Mackin et al. .............. 713/100 |

* cited by examiner

SYSTEM FOR TRANSFERRING CUSTOMIZED HARDWARE AND SOFTWARE SETTINGS FROM ONE COMPUTER TO ANOTHER COMPUTER TO PROVIDE PERSONALIZED OPERATING ENVIRONMENTS

PRIORITY

The present application claims the benefit of provisional patent application "Method and System for Transferring Application Settings, Files and Other Data From One Computer to Another Computer," Ser. No. 60/192,860, filed Mar. 29, 2000.

FIELD OF INVENTION

The present invention relates to a method and system for transferring, via the HTTP protocol, application settings, files and other data from a first computer-based device (e.g., an older PC) including, but not limited to, wired PCs/workstations, etc., wireless electronic devices (e.g., laptops, palm-based systems, telephones, WAP devices, etc.), to a second computer-based device, such as a new replacement PC, so that the second computer-based device will have a substantially similar operating environment as the first computer-based device.

BACKGROUND OF THE INVENTION

In the enterprise, industrial and residential marketplaces, computer-based devices and information applications have become standard. In addition to the continued growth of computer use, turnover of computer-based devices has increased as newer and better ones are produced. As a result, businesses and individual computer-based device users are frequently replacing their computer-based devices with the latest models. This trend will undoubtedly continue as the price of computer-based devices continues to decrease and the need for processing power increases.

One major problem associated with purchasing a new computer-based device is reconfiguring the new system to have the identical or similar operating environment as the one being replaced. Although a user may be interested in a new computer-based device's increased speed or storage capacity, the user typically wants the new computer-based device to have the same "feel" as the one being replaced.

Computer users typically arrange their personal or work computer to suit their preferences. For example on a PC, desktop settings, such as the background design on the monitor, e.g., the "wallpaper", desktop settings or automatic start-up commands are frequently customized. Over time, individuals will normally store certain software applications and data on their PCs. These applications are typically customized to suit the individual user's particular preferences. For instance, with regard to a word processing application, the user may specify a preferred default font, a custom page layout, customized spell-checking dictionaries, and easy access to frequently retrieved files.

More recently, users tend to personalize their computer-based devices so that certain Internet features are stored for later use. For example, users normally customize their computer-based devices to allow easy dial-up access to their preferred Internet service provider or to save their favorite World Wide Web ("WWW") sites, e-mail addresses, browser bookmarks, etc. At the present time, a user must endure both the time and effort to customize every new device that they purchase. No method exists to easily enable the user to selectively direct transference of the "look and feel" or content of existing devices to new or other devices which may differ in format, form factor, capacity, platform, operating system or function. It would be useful to carry the user's configuration from device to device without requiring the user to reconfigure each time (i.e., customizing hardware and software settings, reloading software and files, etc.).

When a user purchases a new replacement computer-based device, it can take many hours to reconfigure the replacement so that the operating environment is similar to the environment of the original. Most software applications are customized according to each individual user's personal preferences. By simply reloading the original software program discs on the replacement computer-based device, the user will lose all of his or her personal preferences. Thus, the user must reconfigure all the applications so they are customized to his or her liking. Not only can this process be time consuming, but it can also be technically difficult for those users with moderate computer-based device experience. In addition, older software applications may be incompatible with the newer computer-based device's operating system, or may require upgrades, and this may further complicate the transfer process.

Normally, the transfer is conducted by one of a variety of tedious and time-consuming methods. A user may opt to copy all the files on the older computer-based device onto a disc or some other storage device and then reload the files on the new computer-based device. This method is extremely time consuming and may possibly be technically infeasible for some users. For instance, many application files are so large that they cannot be stored on a single standard floppy disc or other smaller storage device, thereby making this method unworkable.

Another method involves physically connecting the older and the new systems to one another through some type of compatible cable or networking. After the devices are connected, the user can directly transfer files from one computer-based device to another. This procedure requires the equipment necessary to connect the two computer-based devices to one another, and the steps necessary to make the appropriate transfer is typically beyond the knowledge of most conventional computer-based device users. Even if a user was sufficiently knowledgeable about facilitating such transfer, the present invention expedites the transfer of the desired information.

Each of the options discussed above are time consuming, technically demanding on the user and fail to allow conversion between differing devices, differing software, hardware, platforms, environments, communications standards, etc. Most consumer users, especially residential users, do not have the resources or the know how to undertake the transfer of the appropriate files and settings from one computer-based device to another in a quick and efficient manner. In the enterprise or industrial environment, introducing new computer-based devices or moving/upgrading existing ones becomes a burden because of compatibility, loss of data, and time issues.

What is needed is a system and method which can provide an easy, fast and comprehensive transference of settings, software, and data, while considering modifications thereof based on compatibility, the selected receiving device and user selections. Whatever the precise merits, features and advantages of the prior art, it fails to achieve or fulfill the purposes of the present invention.

SUMMARY OF THE INVENTION

Wherefore, it is an object of the present invention to overcome the above noted drawbacks associated with customizing a second computer-based device, e.g. a new replacement PC, to operate in substantially the same fashion as a first older PC to be replaced.

A further object of the invention is to facilitate a quick and easy method and system for transferring various application settings, files and other personal data from a first computer-based device to a secure temporary storage site and, thereafter, allow the temporarily stored files, settings and other data to be retrieved from the temporary storage site and downloaded onto a second computer-based device, e.g. a new replacement PC, so that the second device will have substantially the same operating environment and personalized feel as the first one.

A further object of the invention is to facilitate a quick and easy method and system for backing-up various application settings, files and other personal data for a computer-based device, storage to a secure temporary storage site and, thereafter, allow the temporarily stored files, settings and other data to be retrieved from the temporary storage site and downloaded back (restore function) to the computer-based device, so that it will continue to have substantially the same operating environment and personalized feel.

A further object of the present invention is to streamline the transportation of the desired application settings, files and other personal data from a first computer-based device to a second computer-based device, without requiring the user to install or use any cabling, other than a conventional connection to the Internet which, in most circumstances, already exists on the first computer-based device.

A further object of the present invention is to streamline the transportation of the desired application settings, files and other personal data in an enterprise or industrial environment, from a first computer-based device to a second computer-based device, e.g. a new replacement computer-based device, without requiring the user to install or use any cabling, other than a conventional connection to an internal LAN, WAN, Intranet or virtual network.

Another object of the present invention is to provide a method and system which initially scans the original first computer-based device to determine the manufacturer, brand, type, version, model, etc., of any software, communications parameters, mouse, keyboard, monitor, printer and other peripherals installed on or electrically coupled to the first computer-based device.

Yet another object of the present invention is to provide a method and system in which the user of the method and system is readily able to select the desired applications settings, files and other data that are to be transferred from the original, first computer-based device to the temporary storage site and also facilitate selection of the files, settings and other personal data to be downloaded, from the temporary storage site onto a second computer-based device, e.g. a new replacement computer-based device.

Still another object of the present invention is to facilitate scanning of the second computer-based device, e.g. the new replacement computer-based device, prior to the downloading of any of application settings, files and other data to ensure that the second computer-based device has the necessary capabilities, e.g. hardware, software, etc., to allow downloading of the temporarily saved files, settings and other personal data on the second computer-based device.

Another object of the present invention is to utilize the HTTP protocol over the Internet, WWW, LANs or other communications networks to facilitate and streamline the process of transferring the application settings, files, data and other personal settings from the first computer-based device to the temporary storage site and finally onto the second computer-based device with little or no technical know how related to the transfer process. The user can simply follow easy and thorough directions supplied by the graphical user interface (GUI), such as e.g., web page interface, operated as part of this invention.

A still further object of the present invention is to facilitate a simple manner in which software applications, installed on the first computer-based device, can be scanned and checked against the currently available versions of each respective application contained on that computer-based device. This can be done in order to determine whether the user possesses the most current version of a particular software application. In the event that the user does not possess the most current version of a particular software application, the system and method will alert the user to that fact and provide the user with the option to make an on-line purchase of the appropriate upgrade of that particular software application for the second new computer-based device.

Yet another object of the present invention is to provide a system which allows computer-based devices, employing a variety of different operating systems, to interact with the website of the server system.

Yet another object of the present invention is to provide a system which allows computer-based devices, employing a variety of different communications standards, to interact with the website of the server system.

A further object of the present invention is to streamline the transportation of the desired application settings, files and other personal data in a consumer, enterprise or industrial environment, employing computer-based devices with a variety of different hardware and software formats.

A further object of the present invention is to streamline the transportation of the desired application settings, files and other personal data using an XML-based solution.

A further object of the present invention is to provide a simple reconnection mechanism to an Internet Service Provider (ISP) and also provide a method and apparatus that allows a user to "undo" a download for one reason or another.

Still another object of the present invention is to provide a system which allows various offers to be presented and allows various advertisers to target specific users based upon the user operating environment information acquired and categorized by the present invention, during the scan of the computer-based devices, to ensure that extremely relevant offers and advertising materials are presented to the users of the scanned computer-based devices with respect to privacy.

The present invention relates to a method for transferring information from a first computer-based device to a web site, for temporary storage and for later transfer of the stored information from the web site to a second computer-based device, the method comprising the steps of: establishing a communication link between a first computer-based device and a web site having a storage capability; scanning the first computer-based device, via the web site, to determine the information contained on the first computer-based device; allowing a user to select which of the scanned information, determined by the web site, is to be uploaded from the first computer-based device onto the web site for temporary storage; and transferring the information, contained on the first computer-based device and selected by the user, onto the web site for temporary storage.

The present invention relates to a system for transferring information from a first computer-based device to a web site, for temporary storage and for later transfer of the stored information from the web site to a second computer-based device, the system comprising: means for establishing a communication link between a first computer-based device and a web site, the web site having storage means for temporary storage of information; means for scanning the first computer-based device, via the web site, to determine the information contained on the first computer-based device; means for allowing a user to select which of the scanned information, determined by the web site, is to be uploaded from the first computer-based device onto the web site for temporary storage; and means for transferring the information, contained on the first computer-based device and selected by the user, onto the web site for temporary storage.

These and other objects and advantages of the present invention will become more apparent after consideration of the following description and the accompanying drawings.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
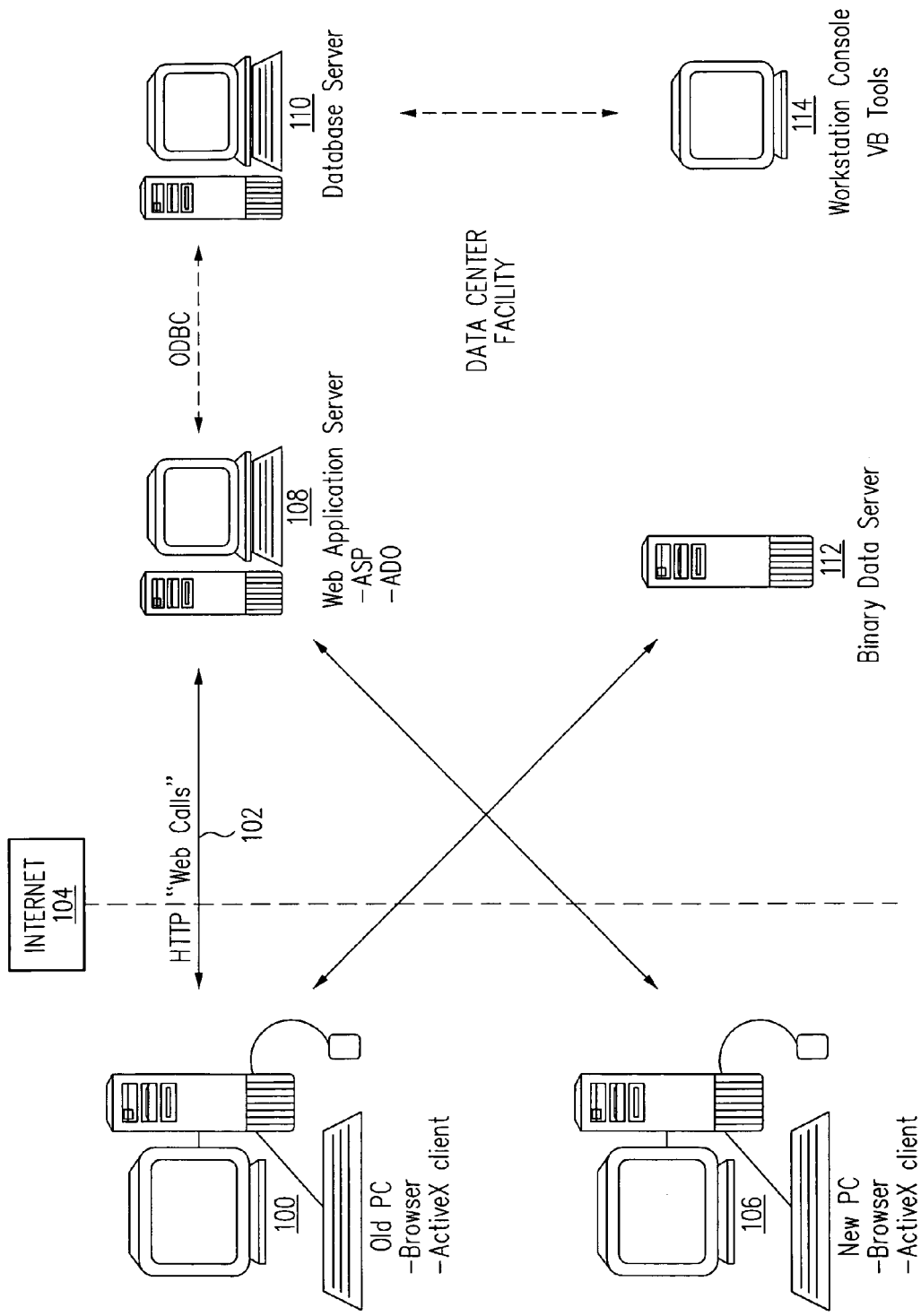
FIG. 1 is a diagrammatic illustration of the architecture of the present invention in an Internet embodiment.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention. Specifically, the preferred embodiment will be described using an upgrade of an old PC to a new PC, however the present invention can be applied equally to any computer-based device without departing from the scope and spirit intended.

Throughout the following descriptions, figures and claims, the terms PC, computer and computer-based device may be interchanged without departing from the scope of the present invention. The process of transferring settings, etc. from the first computer-based device to the server is referred to as the "load" or equivalently "upload" stage. The process of transferring settings, etc. from the server to the second computer-based device is referred to as the "unload" or equivalently "download" stage. In addition, the term "van" is used when referring to the collected settings, files and personal data.

Figure 2:
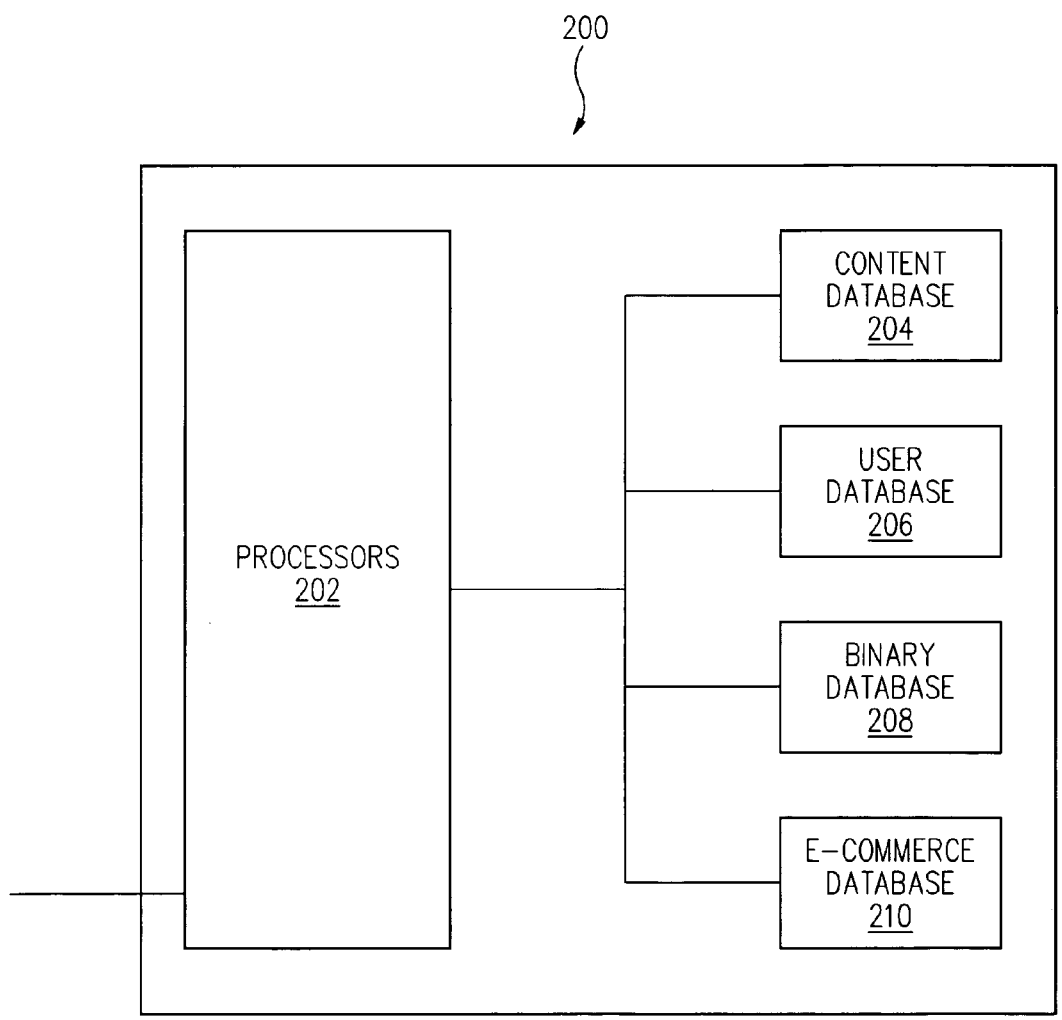
FIG. 2 is a diagrammatic illustration of the various components comprising the website server according to the present invention.

With reference to FIGS. 1 and 2, a brief general description of the present invention will first be provided and this will then be followed by a detailed description of the present invention.

As shown in FIG. 1, a first PC, generally designated as 100, has an internal or external modem (not shown) which is electronically coupled by a conventional connection 102 (wired or wireless) to a communication system, e.g. the Internet (preferred for consumer environment), some other desired local area network (LAN-preferred for enterprise environment), wide area network (WAN), virtual private network (VPN), Intranet, wireless web, or equivalents, generally designated as 104. The PC 100 is also electrically coupled to a display device, e.g. a monitor, by conventional cabling, an input device, e.g. a keyboard, by conventional cabling, and to a mouse. As with typical computer-based devices, the PC 100 also has a plurality of internal components (not separately designated or shown) such as a central processing unit (CPU), some ROM, some RAM, a hard disc drive, and internal computer software. The PC 100, is typically loaded with conventional software, some of which was initially installed on the computer-based device at the time of purchase, while a remainder of the computer software may have been periodically installed by the user in a conventional manner. It is to be appreciated that a variety of other PCs 106, having similar components, may also be simultaneously connected to the website of the server system 108. For the sake of simplicity, an explanation relating to the transfer of information from only one PC 100 to a second PC 106 will be provided. Additional applicable embodiments include, but are not limited to, one-to-plural, plural-to-one and one-to-itself (e.g., using the present invention to backup or restore only the first PC).

As can be seen in FIG. 2, a block diagram of the server system, showing the components 200 that facilitate allowing a user to transfer application settings, files and other data from a first computer-based device onto the web site for later retrieval by another computer-based device, is shown. The website of the server system 200 comprises conventional processors 202 which are electrically coupled, in a conventional manner, to a plurality of databases, such as a content database 204, a user database 206, a binary database 208, and an e-commerce database 210.

Processors 202 comprise and operate the programmed routines that run on the first computer-based device 100 and the second computer-based device 106 to scan those computer-based devices and detect the software applications, application settings, files and hardware data, and any other information necessary for a successful transfer of desired information. After scanning both the first and second computer-based devices involved in the transfer of information (as discussed below in further detail), the SMOD then compare and correlate the relevant data from the first computer-based device 100 with that of the second computer-based device 106 to determine what application settings, files and other data are available for transfer. The processors 202 facilitate displaying of this information to the user and ultimately facilitate the transfer of the application settings, files and other data that the user selects to be transferred from the first computer-based device 100 into storage and later onto the second computer-based device 106, as discussed below.

Server system 200 also comprises one or more individual databases 204–210 to enable the storage and retrieval of user data, web site content data, internal use data, data regarding current software application versions, and other miscellaneous data. The processors 202 are able to interact with each database to retrieve data necessary to carry out the desired routines. The processors 202 are also able to interact with each of the individual databases in order to store data within those databases.

This server system 200 contains a content database 204 for the purpose of storing any data (WAF) that is displayed to the user, e.g., GUIs, web site pages, advertisements, offers, etc., as well as any data related to applications and application settings obtained from the manufacturers of the respective software applications. This database will be updated frequently to continually contain the most current data regarding software applications and their application settings.

Server system 200 also contains a user database 206 for the purpose of storing data related to each individual user's computer-based device, personal profile, applications, account number, login password to the system server, etc. The processors 202 will utilize this user data to facilitate the transfer process. The user data can also be used to trigger the server system to display to the user, via the web site, advertisements and offers targeted to the user's particular profile, as discussed below in further detail.

Server system 200 also contains a Binary Database 208 to store binary files, e.g., documents, e-mails, address books, etc. uploaded from the first computer 100. The user selects specific data stored for download to the second computer 106.

Server system 200 also contains an e-commerce database 210 to store data related to on-line purchases by the user with relation to the transfer process. For instance, during the transfer process, the server system may have detected and informed the user that a software application on the first computer-based device 100 has since been upgraded. In turn, the user may decide to purchase, through the server system, the most recent upgraded version of the software for the second computer-based device. All the data necessary for this purchase, e.g. credit card information, billing information, etc., can be handled and stored in this database.

An overview of the process of uploading and temporarily storing settings, files and other data on the web site of the server system 200, for later transfer to a new replacement second computer-based device 106, will now be described with reference to FIGS. 1 and 3. When a user of the first computer-based device 100 desires to replace the first computer-based device 100 with a second computer-based device 106, for example, the user accesses the web site of the appropriate server system 108, via the communication system (e.g., modem-not shown) and the conventional connection 102 of the first computer-based device 100, to transfer various software applications, files, settings and other data of the first computer-based device onto the web site of the appropriate server system 110 for later transfer to the second computer-based device, e.g. a replacement computer-based device 106.

Figure 3A:
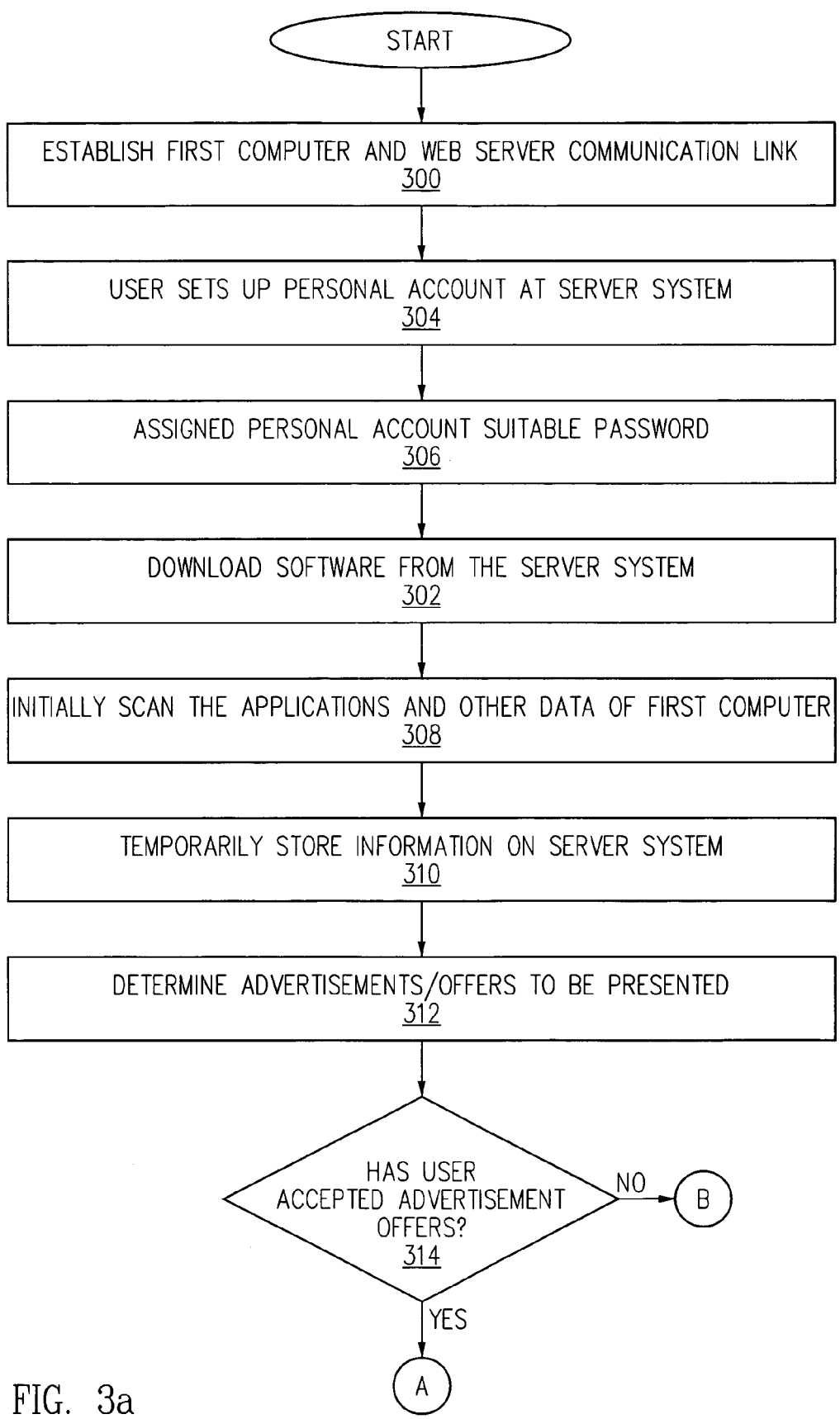
FIGS. 3a and 3b, collectively illustrate an overview of the upload steps of the present invention.
Figure 3B:
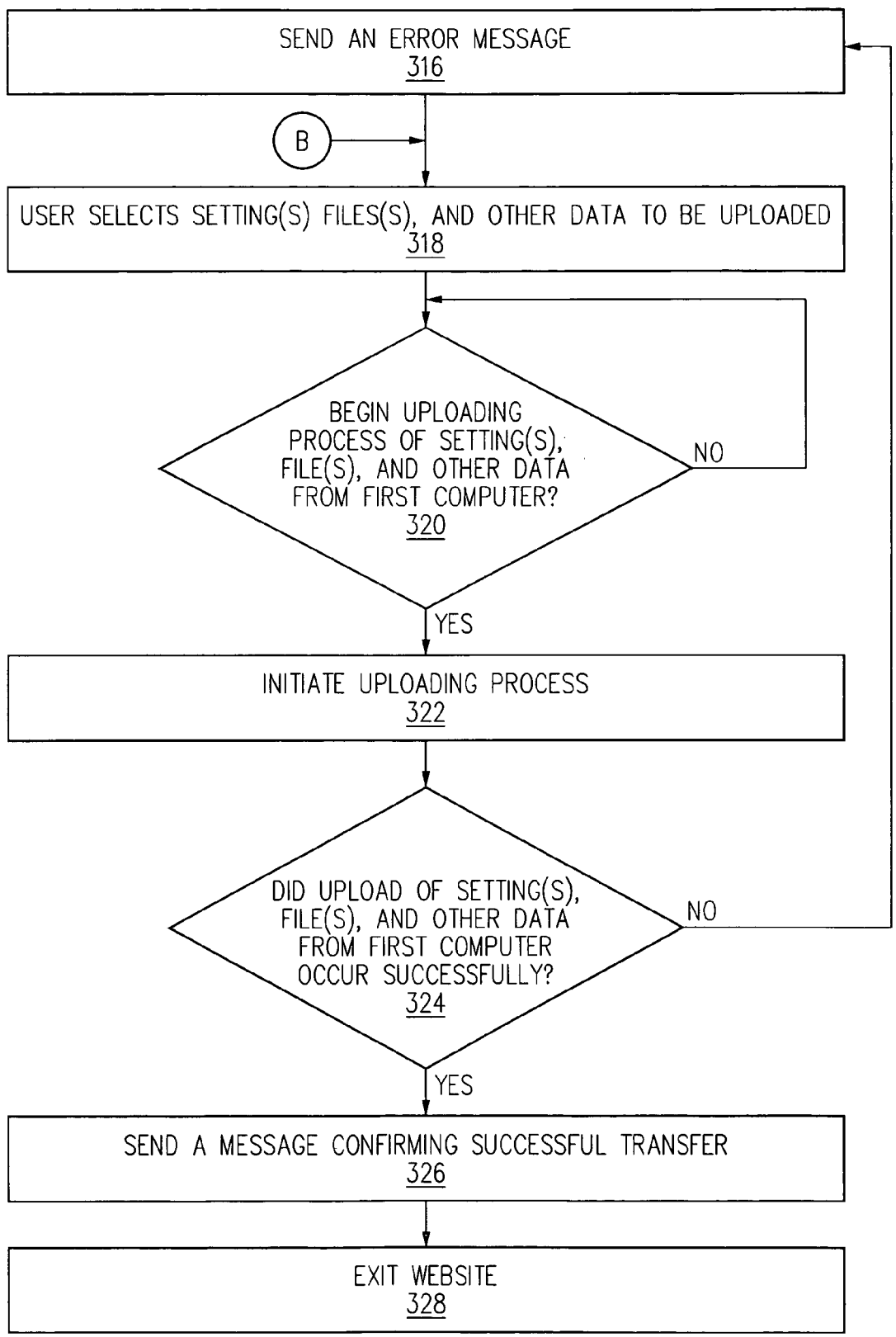

The user of the computer-based device 100 accesses the website of the server system 200 by initializing the modem and communicating with the web site of the server system via the communication system, in a conventional fashion, at step 300 (FIG. 3). As such connection is conventional and well known in the art, and forms no part per se of the present invention, a detailed description concerning the same is not provided.

Once a communication link is established, at step 300, between the first computer-based device and the web site of the server system, the user sets up a personal account to be maintained by the server system, at step 304, to which all of the files, settings and other data to be uploaded from the first computer-based device are to be temporarily stored. This personal account is assigned a suitable password, in a conventional manner at step 306, by the user prior to uploading all of the desired files, settings and other data from the first computer-based device.

Then, the user of the first computer-based device can download software (client ATL DLL-CAD) from the server system, at step 302, so that the user can then interact with the website of the server system to select the desired setting, files, information and other data to be uploaded from the first computer-based device 100 for temporary storage and later retrieval as desired.

After the user downloads the necessary software (client ATL DLL-CAD) from the web site of the server system to the first computer-based device, via the communication system, the user can then begin interacting with the web site of the server system, and the user requests the server system, via the server system's web site, to initially read or scan all of the software applications and other data stored on the first computer-based device, at step 308. During this initial scanning process, the manufacturer, the brand, the version, the type, etc., are determined for each installed software application(s), mouse, keyboard, monitor, printer and other peripherals and the personal settings designated for each software application as well as other information concerning the operating environment of the first computer-based device are ascertained. Upon completion of the initial scanning step, this scanned information is temporarily stored in the user database 206 of the web site of the server system, at step 310. Once the user's personal account has been set up, the user requests the server system, via the server system's web site, to initially read or scan all of the software applications and other data stored on the first computer-based device, at step 308. During this initial scanning process, the manufacturer, the brand, the version, the type, etc., are determined for each installed software application(s), mouse, keyboard, monitor, printer and other peripherals and the personal settings designated for each software application as well as other information concerning the operating environment of the first computer-based device are ascertained. Upon completion of the initial scanning step, this scanned information is temporarily stored in the user database 206 of the web site of the server system, at step 310.

Figure 5:
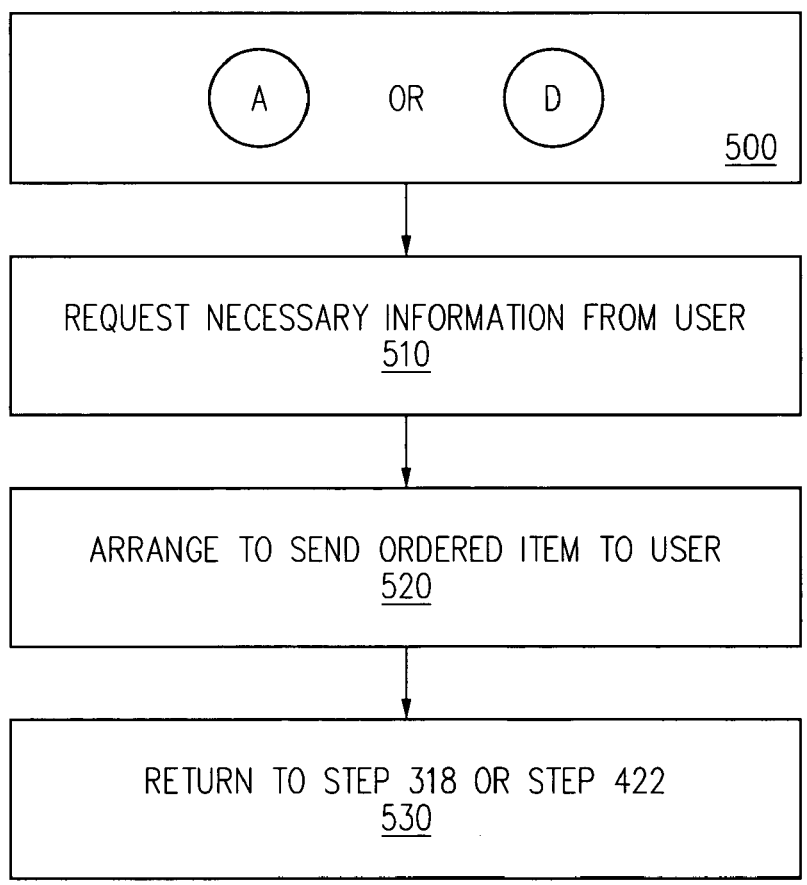
FIG. 5 is a diagrammatic illustration of an e-commerce embodiment, e.g., for a user accepting an advertisement or order.

Next, the web site of the server system then determines, at step 312, which advertisement(s) and/or offer(s), stored in the web site of the server system, are applicable and are to be presented to the user of the first computer-based device. Once such advertisement(s) and/or offer(s) information is determined, this information will be displayed to the user, at step 314. In the event that the user would like to purchase, accept, agree to, enroll, etc., any of the advertisement(s) and/or offer(s) presented to the user, the user can click on a desired location of the display screen displaying the advertisement(s) and/or offer(s) information which will allow the user to purchase, accept, agree to, enroll, etc. such advertisement(s) and/or offer(s) and the system proceeds to step 500 (FIG. 5). Otherwise, the user can decline the advertisement(s) and/or offer(s) by entering or clicking on a "No Thanks", or other related area or button to decline the same.

In the event that the user decides to accept an advertisement or offer, the system will proceed to step 510 where all the necessary information from the user is obtained. Specifically, depending upon the advertisement or offer accepted by the user, the following information may be obtained from the user, at step 510, e.g. credit card information to pay for ordered computer-based device software or updated version of the software, a mailing address or e-mail address to which the requested information, promotional material, further advertisements, survey, etc., may be send or directed, etc. It is to be appreciated that the type or kind of information to be obtained from the user can vary from application to application and is dependent specifically on the product, item, good and/or service being promoted or offered to or accepted by the user. Next, at step 520, the system makes the necessary arrangements to either send or mail the ordered or requested product, item, good and/or service to the user or to forward the same directly to the user, via the Internet. Finally, at step 530, this system returns to step 318.

Following completion of this initial scanning procedure, the web site of the server system then displays a GUI to the user, at step 318 via the web site of the server system, said GUI includes a prompt for the user to select the desired application setting(s), file(s), and other data which are to be uploaded from the first computer-based device, via the communication system, and temporarily stored in the personal account of the user set up at the web site of the server system. The server system will also display to the user the estimated upload time for uploading all of the selected settings, files and other data onto the server system. Preferably the displayed estimated time value will increase or decrease, as appropriate, as the application setting(s), file(s), and other data which are to be uploaded are selected or canceled (once selected) by the user. After the user has selected all of the desired settings, files and other data to be uploaded, the web site of the server system will then prompt, at step 320, whether or not to begin the uploading process of the select application setting(s), file(s), and other data from the first computer-based device to the web site of the server system.

In the event that the user initiates the uploading process, at step 322, the web site of the server system then interacts with the first computer-based device, via the communication system, to coordinate the sequential transmission of all of the selected settings, files, and other data, which are to be uploaded from the first computer-based device and temporarily stored in the personal account of the user at the server system. Once this upload process is completed, the web site of the server system then confirms whether or not, at step 324, a successful transfer of all of the selected application setting(s), file(s), and other data from the first computer-based device to the web site of the server system has occurred. If the web site of the server system determines that such transfer was successfully completed, the web site of the server system sends a message, at step 326, confirming the same to the user. If all of the selected application setting(s), file(s), and other data to be transferred from the first computer-based device to the web site of the server system were successfully received by the web site of the server system, the user can then exit from the web site of the server system, at step 328, in a conventional manner. Thereafter, these uploaded files, settings, and other data will remain temporarily stored in the personal account of the user at the web site of the server system for a predetermined period of time, e.g. a year or so, or until the user retrieves all of the temporarily stored files, settings and other data from the personal account of the user at the web site of the server system, e.g. once the user has purchased a new computer-based device and downloads all of the temporarily stored settings, files, and other data to the new computer-based device 106.

If the web site of the server system determines that some or all of the selected application setting(s), file(s), and other data, transferred from the first computer-based device, were not successfully received by the web site of the server system, then the web site of the server system sends an error message, at step 316, indicating this and the system returns to step 318 to attempt another transfer of the selected application setting(s), file(s), and other data, transferred from the first computer-based device to the web site of the server system, as described above.

The process of downloading the temporarily stored settings, files, and other data onto a second computer-based device 106, e.g. a newer replacement computer-based device, will now be described initially with reference to FIGS. 1, 4a and 4b. The second computer-based device, generally designated as 106, has an internal or external modem electronically coupled by a conventional connection to the communication system, e.g. the Internet, some other desired local area network, etc., generally designated as 104. The second computer-based device 106 is also electrically coupled to a display device, e.g. a monitor, by conventional cabling, an input device, e.g. a keyboard, by conventional cabling, and to a mouse by conventional cabling. As with typical computer-based devices, the computer-based device 106 also has a plurality of internal components (not separately designated or shown) such as a central processing unit (CPU), some ROM, some RAM, a hard disc drive, and internal computer-based device software. The computer-based device, is typically loaded with conventional software, some of which was initially installed on the computer-based device at the time of purchase while additional computer-based device software may have been periodically installed on the computer-based device by the user in a conventional manner. It is to be appreciated that a variety of other second computer-based devices, having similar components, may also be simultaneously connected to the web site of the server system.

Figure 4A:
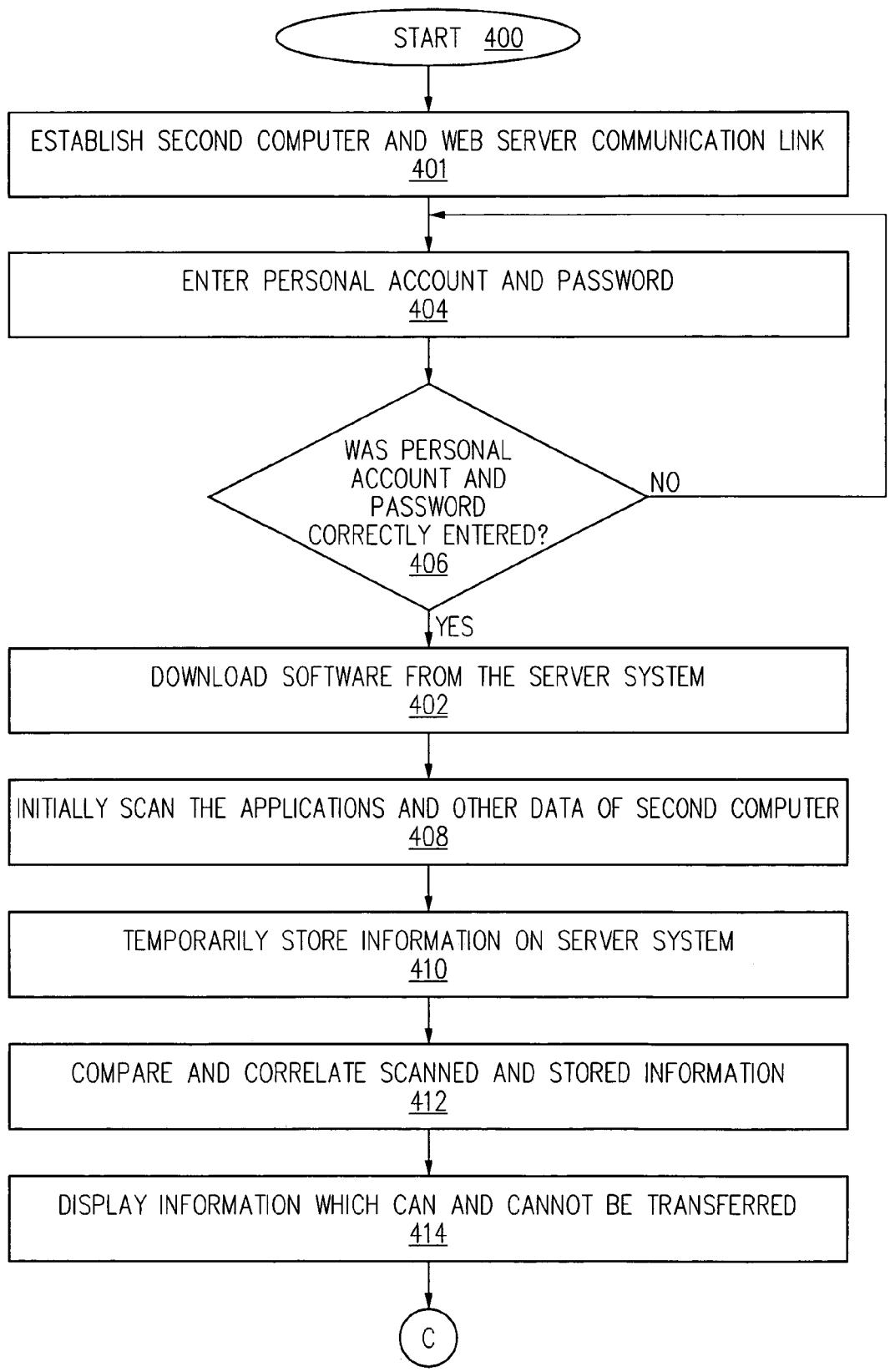
FIGS. 4a and 4b, collectively illustrate an overview of the download steps of the present invention.
Figure 4B:
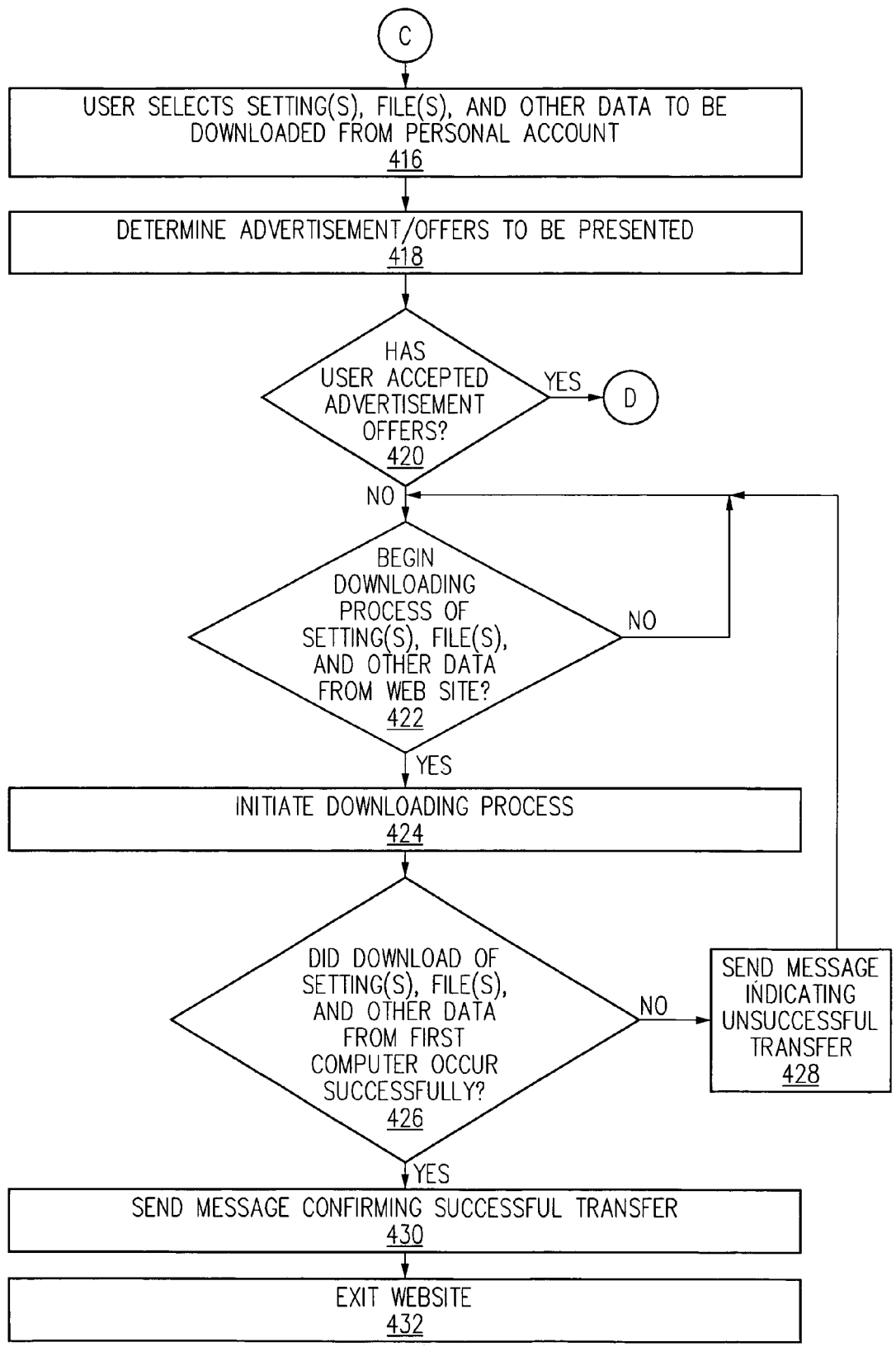

When the user desires to transfer some or all of the temporarily stored files, settings and other data to a second computer-based device, the user contacts the web site of the server system via the second computer-based device, at step 400 (FIG. 4*a*). The second computer-based device 106 contacts the web site of the server system via the second computer-based device's modem and the Internet in a conventional fashion. Once a communication link is established, at step 401, between the second computer-based device 106 and the web site of the server system, the user accesses his or her personal account during step 404, by entering the previously assigned account number and selected password in a conventional manner. Assuming that the personal account is successfully accessed by the user at step 406, i.e. the correct account number and password information are provided, the user is then provided access to the previously uploaded settings, files and other data of the user temporarily stored in the personal account at the server system. Otherwise, the user is not provided access to the previously uploaded settings, files and other data.

Then, the user of the second computer-based device downloads computer-based device software (client ATL DLL-CAD) from the server system, at step 402, enabling the user to interact via the web site of the server system to select and download the desired setting, files, and other data which were previously stored for later retrieval.

Assuming that the personal account is successfully accessed, the user directs the server system to read or scan the internal components of the second computer-based device 106, at step 408, to determine essential hardware and storage information, the manufacturer, the brand, the version, etc. of each installed software application, mouse, keyboard, monitor, printer, and other peripherals as well as other information concerning the operating environment of the second computer-based device. The information read during the scanning step is temporarily stored, at step 410, at the server system. The website of the server system then performs routines, at step 412, to compare and correlate the scanned and stored information of the first computer-based device of that user to the scanned information of the second computer-based device of that user. During this process, the website of the server system correlates the software applications, application settings and other operating information environment of the first computer-based device 100 to the second computer-based device 106. The server system will determine whether the particular application settings, stored on the web site of the server system, are from the most recent version(s) of that particular software or whether there are other currently available versions of that particular software which are not present on the second computer-based device. In the event that the web site of the server system detects that a more recent version(s) of a particular software application is/are available, the web site of the server system will convey that information to the user. Furthermore, the web site of the server system will provide to the user the option, at step 420, of purchasing the most recent upgrade of the particular software application, via an on-line purchase over the Internet. If the purchase of the upgrade is accepted, the web site of the server system will either download or ship the software directly to the user to install on the second computer-based device and bill the user for the same.

After this correlation step is complete, the web site of the server system identifies and displays to the user, at step 414 via the web site of the server system, the application settings and other operating environment information that are possible to be transferred from the first computer-based device 100 to the second computer-based device 106 and also displays to the user any application settings and other operating environment information that are not possible to be transferred from the first computer-based device to the second computer-based device. The website of the server system, will then prompt the user, at step 416, to select all or a certain portion of the stored files, settings and other data from the first computer-based device which are to be downloaded from the personal account of the user at the web site of the server system to the second computer-based device, via the communication system. As the user selects all of the desired files, settings and other data to be downloaded, the web site of the server system will then display to the user the estimated time it will take for downloading all of the selected files, settings and other data from the personal account of the user at the web site of the server system to the second computer-based device.

As with the upload, the web site of the server system can next determine which advertisement(s) and/or offer(s), stored in the web site of the server system, are applicable and are to be presented to the user of the second computer-based device. Once such advertisement(s) and/or offer(s) information is determined, this information will be displayed to the user, at step 418. In the event that the user would like to purchase, accept, agree to, enroll, etc., any of the advertisement(s) and/or offer(s) presented to the user, the user can click on a desired location of the display screen displaying the advertisement(s) and/or offer(s) information which will allow the user to purchase, accept, agree to, enroll, etc. such advertisement(s) or offer(s), and the system proceeds to step 500 (FIG. 5). Otherwise, the user can decline the advertisement(s) and/or offer(s) by entering or clicking on a "No Thanks", or other related area or button to decline the same and proceed to step 422.

In the event that the user decides to accept an advertisement or offer, the system will proceed to step 510 where all the necessary information from the user is obtained. Specifically, depending upon the advertisement or offer accepted by the user, the following information may be obtained from the user, at step 510, e.g. credit card information to pay for ordered computer-based device software or updated version of the software, a mailing address or e-mail address to which the requested information, promotional material, further advertisements, survey, etc., may be sent or directed, etc. It is to be appreciated that the type or kind of information to be obtained from the user can vary from application to application and depend specifically on the product, item, good and/or service being promoted or offered to or accepted by the user. Next, at step 520, the system makes the necessary arrangements to either send or mail the ordered or requested product, item, good and/or service to the user or to forward the same directly to the user, via the Internet. Finally, at step 530, this system returns to step 422.

After the user has selected all of the desired settings, files and other data to be downloaded, the web site of the server system will then prompt, at step 422, whether or not to begin the downloading process of the select application setting(s), file(s), and other data from the personal account at the web site of the server system to the second computer-based device.

In the event that the user initiates the downloading process, the web site of the server system then interacts with the second computer-based device 106, via the communication system 104, to coordinate the sequential transmission of all of the temporarily stored and selected settings, files, and other data, at step 424, which are to be downloaded from the personal account of the user at the server system to the second computer-based device. Once this download process is completed, the web site of the server system then confirms, at step 426, whether or not a successful transfer of all of the selected application setting(s), file(s), and other data from the personal account of the user at the server system to the second computer-based device has occurred. If the web site of the server system determines that such transfer was successfully completed, the web site of the server system sends a message, at step 430, confirming this to the user. If all of the selected application setting(s), file(s), and other data to be transferred from the personal account of the user at the server system were successfully received by the second computer-based device, the user can then exit from the web site of the server system, at step 432, in a conventional manner. Thereafter, the user can either leave these uploaded files, settings, and other data temporarily stored in the personal account of the user at the web site of the server system for an additional period of time, e.g. another year or so, or the user can delete, in a conventional manner, all or a portion of the uploaded files, settings, and other data until the user again retrieves the same. Should a user choose to keep the selected application setting(s), file(s), and other data on the web site of the server system, that user will be able to access the selected application setting(s), file(s), and other data remotely and also be able to use the web site of the server system for on-line back up purposes.

If the web site of the server system determines that some or all of the selected application setting(s), file(s), and other data, transferred from the web site of the server system were not successfully received by the second computer-based device, then the web site of the server system sends an error message, at step 428, indicating this and the system returns to step 422 to attempt another transfer of the selected application setting(s), file(s), and other data, transferred from the personal account to the second computer-based device, as described above.

Figure 6:
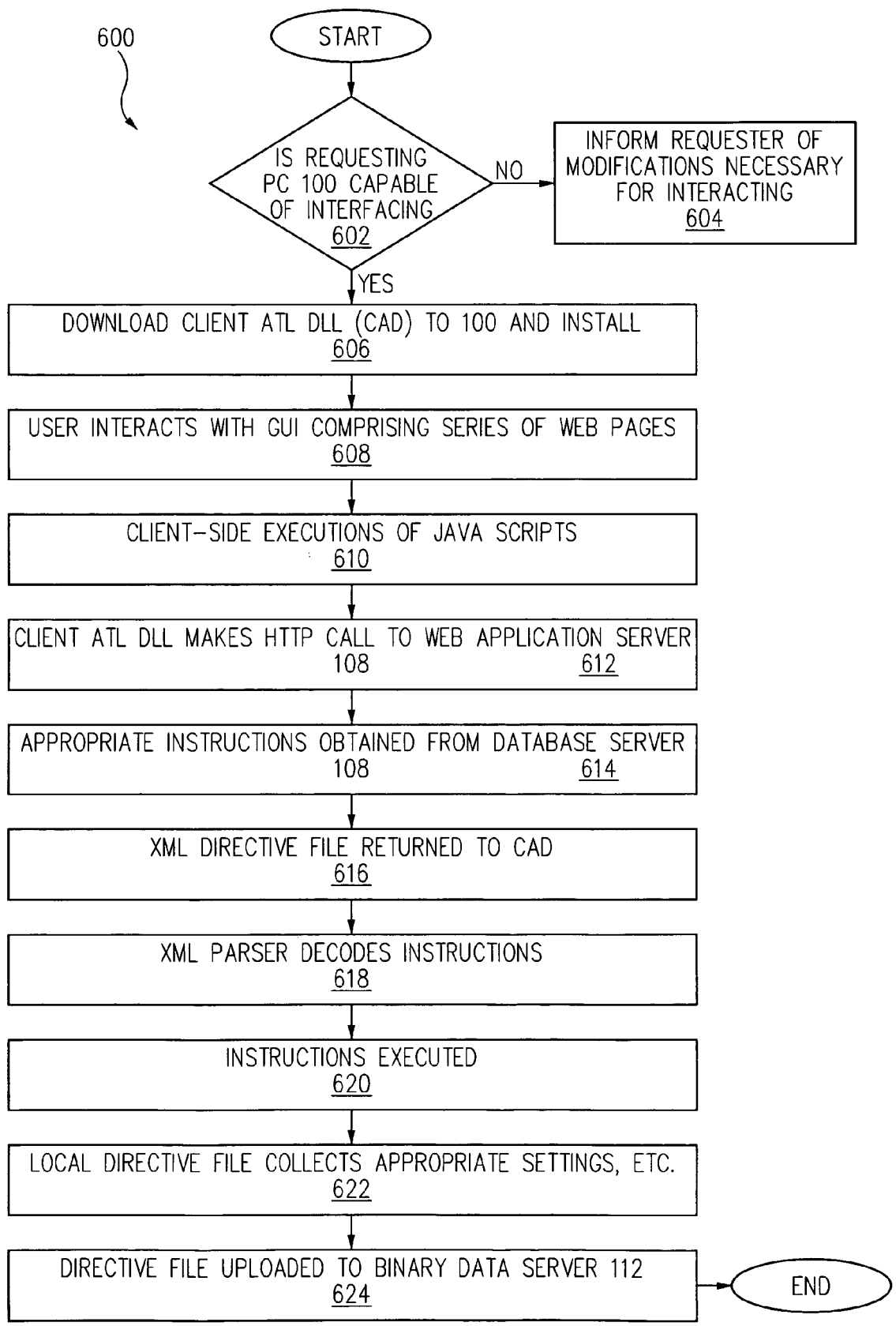
FIG. 6 is a diagrammatic flow diagram illustrating a routine transferring application settings, files, and other data from a first computer-based device onto the web site for temporary storage, conversion and downloading to a differing computer-based device.
Figure 7:
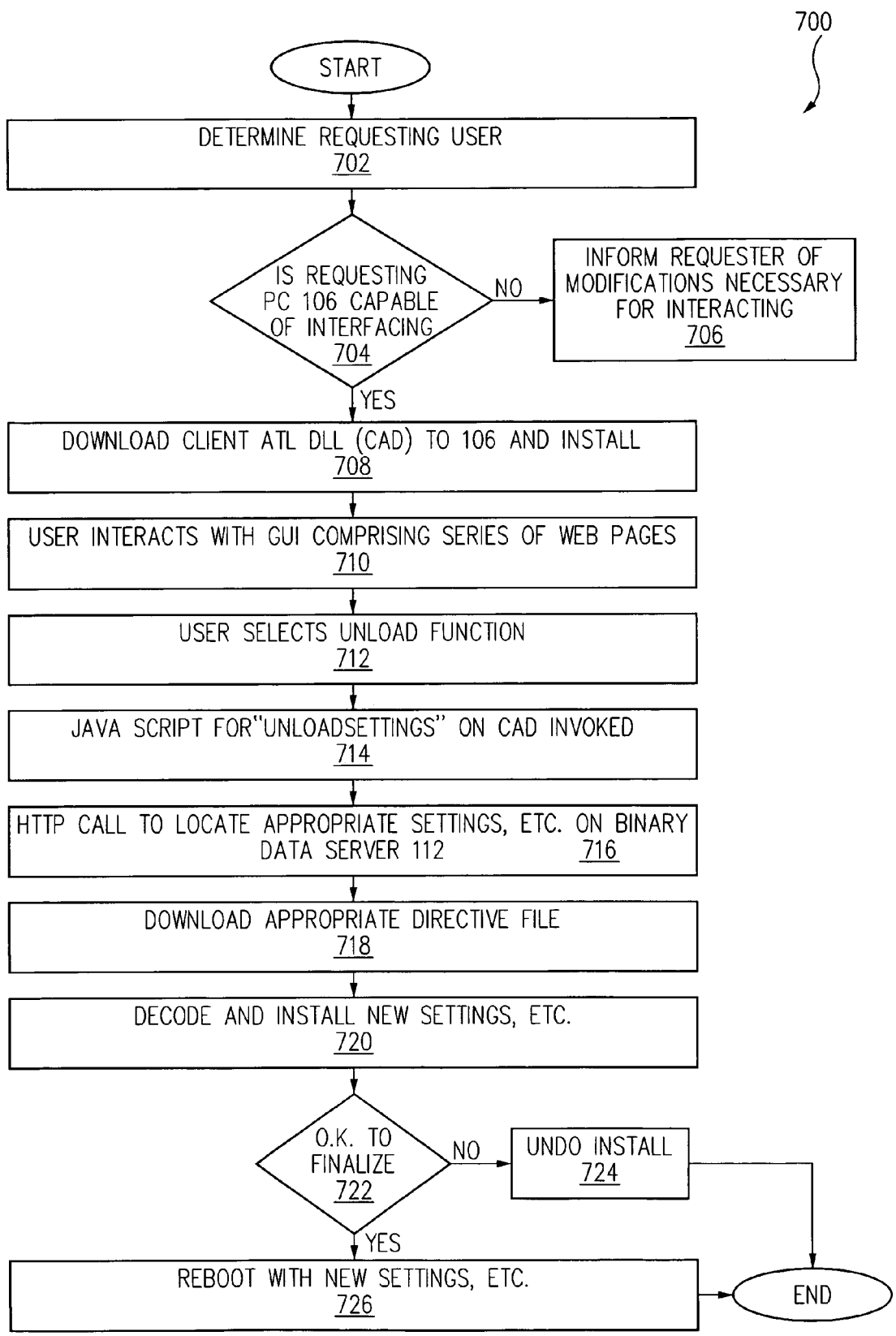
FIG. 7 is a diagrammatic flow diagram illustrating the routine for retrieving the temporarily stored application settings, files, and other data from the web site onto a new computer-based device.

A more detailed discussion of the upload/download (load/unload) process of the present invention follows below:

A user will first interact with the system by hitting the homepage of the website controlled by web server 108. This website is a traditional web server that simply hosts normal company pages. From the home page on this website, the user is able to hit a link 102 to begin using the system. Referring to FIG. 6, at this point the user's web browser accesses a gateway page on the Web Application Server 108 that allows the system to detect if the user's computer 100 is capable of interfacing with the core processing of the present invention 602. If the user fails to meet the criteria 604(examples would be-JavaScript turned off, browser version not supported, OS not supported, etc), then they get a response page that tells them what they should do to become compatible. If they are compatible, then they get a response page which causes a client ATL DLL, hereafter CAD, to automatically be downloaded 606 and installed on their computer using the Internet Download and Microsoft® authenticode features of Internet Explorer 4/5®. The user will then interact with a graphical user interface (GUI) that is provided by a sequence of webpages 608. As the user chooses different actions, this is typically executing client-side JavaScript routines 610. The JavaScript routines are able to call automation methods on the CAD. As an example to facilitate the illustration of the system, consider that the user has clicked a button in a web page that enables loading of their settings into the website. Upon clicking the "load" button, a JavaScript routine will invoke a "LoadSettings" method on the CAD. The CAD starts by making a HTTP call 612 to a Web Application Server to ask it to provide instructions on how to collect the settings that the user has chosen. The HTTP call causes the Web Application Server 108 to run an Active Server Page (ASP) that uses an Active Data Object (ADO) to run a query on a database located at the Database Server 110. The Database Server returns a result set that contains the information about how to collect each setting 614 (For example, a record in the result set might say that the Outlook-2000® personal address book is identified by their registry key HKCU\Software\Microsoft\Outlook\PAB). The Active Server Page receives the entire result set from the Database Server 110 in the Active Data Object. The Active Server Page steps through each record in the ADO and converts it into a data stream that uses XML tags to delineate the fields in the records. This XML format of data with the website specific tags is called a directive file. The directive file is returned to the CAD 616 as a response from the HTTP call. The CAD uses its XML Parser to decode the instructions 618 from the website. It then executes the instructions 620 (For example, it would fetch the value in HKCU\Software\Microsoft\Outlook\PAB). The CAD accumulates the settings data into a local directive file 622 as it runs each instruction. When done, the CAD makes a HTTP POST call to upload the directive file 624 to the Binary Data Server 112. The CAD then makes a HTTP call to tell the server 108 the settings have been uploaded. Referring to FIG. 7 at this point, the user would likely interact with some additional web pages and eventually be told to visit the website from their new computer-based device. On the new device 700, after passing through the same general auto install process just described above (steps 702–710), they would get to the point where the could click an "UnLoad" button 712. This would trigger the JavaScript, which invokes an "UnLoad Settings" method on the CAD 714 (now located on the new computer-based device). The client would make a HTTP call 716 to request where it should find the directive file that holds the user's settings. It would then make an HTTP POST call to retrieve the appropriate corresponding directive file to the new computer 718. Once downloaded, it would decode the directive file and follow the instructions to install the user's settings 720. In most cases, when done, the user will re-boot 726 and his/her settings will then take effect 722. An option to undo the load is also given 724.

The CAD is the module of the system the runs on the end user's old and new PC. Responsibilities here would include scanning of the registry, interaction with the user, and communication with a Web Application Server using "web calls." The client would also upload and download binary data files like bitmaps, Word docs, etc. from a Binary Data Server. Key components to the client are:

Active Template Library (ATL) based C++ ActiveX control hosted in IE® browser

Directive processor that follows the actions defined in directive files

XML parser that encodes and decodes the directive file format

Figure 8:
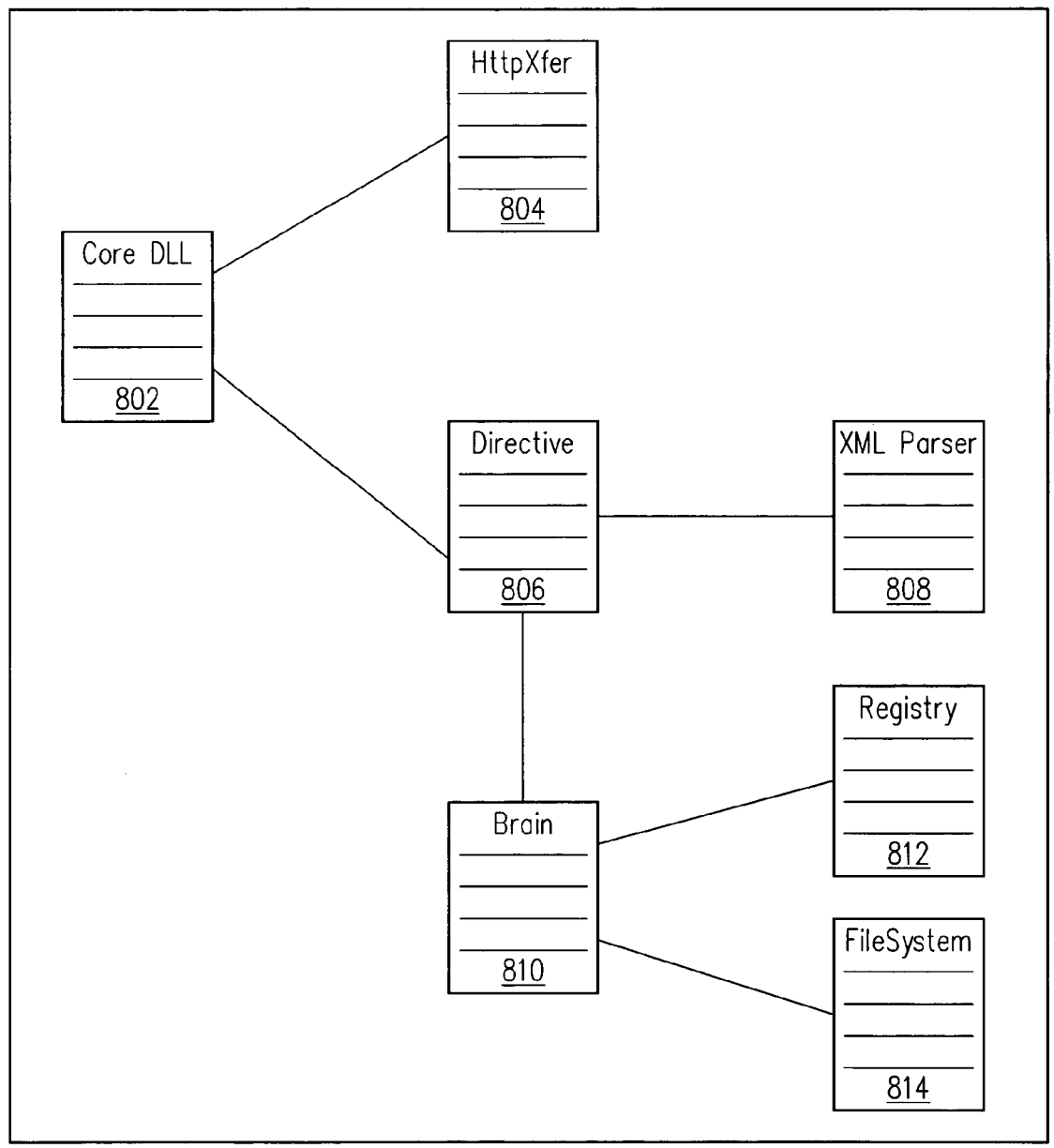
FIG. 8 is a diagrammatic illustration including the client ATL DLL according to the present invention.

The client ATL DLL CAD is a simple object-oriented system as shown in the UML diagram of FIG. 8:

The core DLL 802 maintains the functionality inherited from the ATL foundation classes to provide the ActiveX control support required for the DLL to be hosted by IE 4/5 browsers.

HttpXfer 804: This is an object that encapsulates the asynchronous file transmissions that occur to/from the website 108 Web and Binary Data Servers 112.

Directive 806: The Directive object responds to the actions that come from the tags that the XML Parser decodes from directive files.

XML Parser 808: This is responsible for decoding directive files.

A Brain 810: The Brain (processor) carriers out the actions it is dispatched from the Directive object.

Registry 812 and FileSystem 814: These objects are used by the Brain (SMOD) to access the settings in the registry and files in the filesystem.

The Web Application Server 108 is a multi-faceted module, which physically may be many servers. Responsibilities here would include serving web pages, processing "web calls", processing e-commerce orders for affiliates, and reporting. Key components would be:

Stock web pages for Internet presence

"Stealth" Active Server Pages for application logic in "Web Calls"

Active Server Pages (ASP) that drive the flow of the browser GUI

Creating directive files for transmission to the client

Decoding directive files from a client to store in the database

E-commerce processing

The Database Server 110 module is a data repository for the programming of the present invention system. It services requests from the Web Application Server(s) 108, reporting systems, and system tools. Key data models of the Database Server are:

Accounts and user demographics: logins, passwords, names, e-mail addresses, last time system used, user profile, value of settings being integrated, etc.

Application Settings Repository: known applications, settings of known applications, settings categories, application versions, conversion tables for settings, etc.

Binary data catalog: name and location of user binary files on the binary data server(s)

Affiliate and Promotional Sales: ad pictures, start/stop run periods, profiles a promotion matches, etc.

The Binary Data Server 112 receives and transmits binary data files to/from the client.

HTTP file storage for user data files

Other than functionally being able to serve the present invention operations, this architecture is also intended to offer long-term viability through simple and straightforward ways to gain reliability and scalability in the system. Web Application Servers can be added as demand grows. Because no state is stored in the servers, they can be exact copies of each other. No changes would be needed to any of the client software or ASPs. Simply add another box, copy the ASPs to it and add it into the round-robin. Through connection pooling, the present invention gets economies of scale with the Database Server 110. When the time comes, clustering can be used to add capacity. As file space demands increase, Binary Data Servers 112 can be added. With it being possible to have more than one server at each point in the architecture, reliability is easily handled by redundancy of servers at each point.

Figure 9:
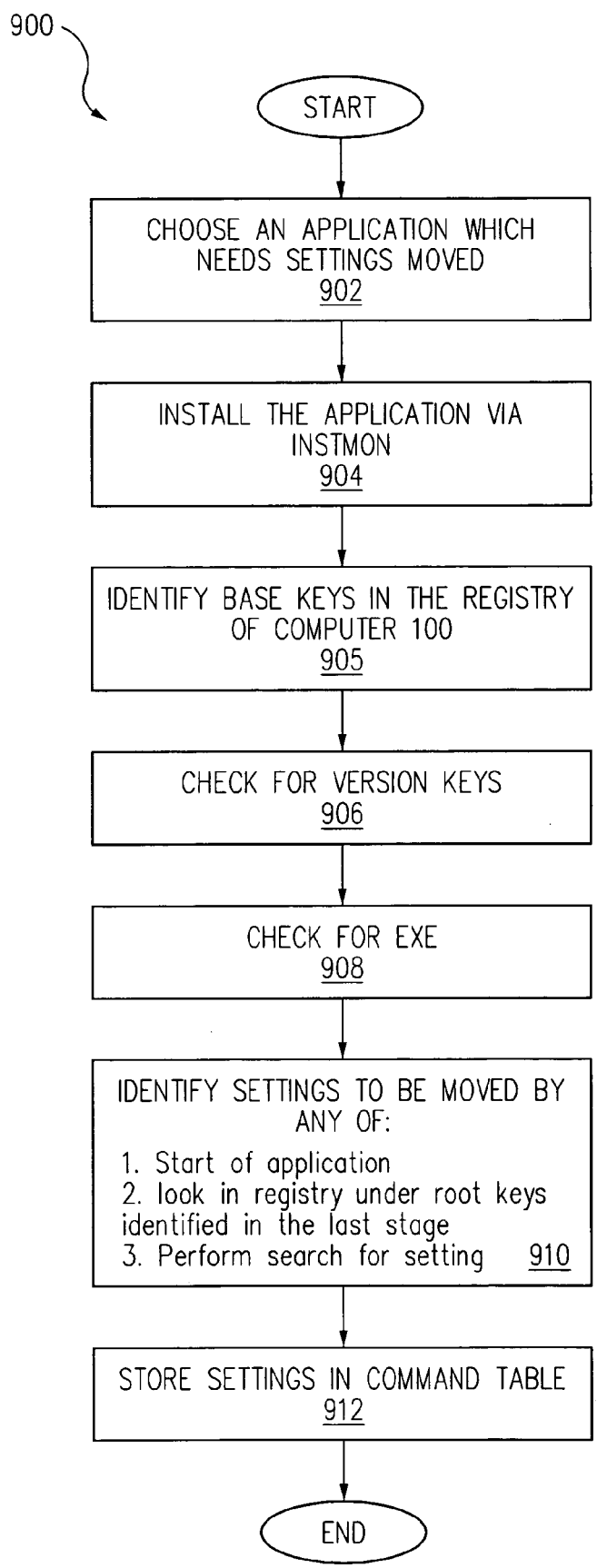
FIG. 9 is a diagrammatic illustration of a partial CAD implementation.

FIG. 9 and its corresponding description below will lay out a basic methodology for settings gathering 900. Specific settings chosen should not limit the scope of the invention. Any settings, files, programs or data can be substituted therefore using the techniques outlined below.

Choose an application which needs settings moved 902.

Install the application via Instmon (see the Instmon section below) as you may need this information later 904.

The first things that must be identified are the base keys in the registry for this application 905.

Usually these are: HKEY LOCAL MACHINE\Software\<company name>\<app name>and HKEY_CURRENT_USER\Software\<company name>\<app name>

A combination of registry keys must be found which are unique for this version of the application so the CAD can detect if this particular version of the application is installed on the PC or not. To this end, here is the predominant way of detecting if a particular version of an application exists on a PC.

Check to see if a version key exists 906; like: <KeyExists>HKLM\SOFTWARE\Microsoft\Windows\CurrentVersion\Internet Settings\5.0</KeyExists>

Check to see if the exe is still there on the PC 908(because an uninstall may not have nuked the registry entries). like: <FileExistsAtValue>HKLM\SOFTWARE\Microsoft\Windows\CurrentVe rsion\App Paths\IEXPLORE.EXE\</FileExistsAtValue>

Once the set of keys, which will tell if a version of an application is installed, have been found, the application and version can be put in the CDS Products table. Then the identified detection sequence must be added to the ReviewDirective.xmi.

Next the settings to be moved must be identified 910.

Start the application and determine exactly which settings need to be moved.

For each setting identified, look in the registry under root keys identified in the last stage to see if the desired settings are readily available under these keys.

It is preferable to move multiple settings at once, so when possible use <StoreRegistryTree>over <StoreKeyValue>(chosen XML tags).

If they are not easily identifiable, then a search must be performed. There are many possible ways to find these settings.

For text-based settings you can put in a unique string for the data in the application, and then search for that data in the registry using RegEdit.

Regmon (see regmon section below) can be run to see where the change was written in the registry.

"Advanced Registry Tracer" (see ART section below) can be used to find out what changed in the registry by comparing before and after copies of the registry.

Instmon (see instmon section below) can be used to monitor the installation to find all the keys that the application creates or modifies during its installation.

If the setting can still not be found then it may not be in the registry.

Once the setting has been identified, it needs to be put in the Commands table 912. Once all commands have been added, the stored procedure CDS spBuildAllSnippets is run to generate the new snippets.

A PID (product ID) is an application/version pair. It is basically a version of an application for which the registry entries are consistent. An application is just what you would think; it is one software program like "Word®", "Excel®", "Visio®", "WinZip®". A version is not necessarily the same as the version on the application; we only need to add a new version when the registry structure for this application changes. So if WinZip 7.0 through WinZip 7.0 SR-7 all save data to the registry the exact same way, then we only need to add one version and thus one PID to the database. But if for instance Visio 2000 Enterprise edition® saves data to the registry in a different structure than does Visio 2000 Personal edition®, then a version and thus a PID must be added for both of these.

Another note is that there may be helper apps that were conditionally installed with some applications, and these must also be added as their own PIDs. For instance, when you install Word 97 ® from Office97 ® you may also choose to install BookShelf97 ®. If we want to move settings for BookShelf97 then we will have to add it as its own PID because just because Word97 is installed does not mean they installed BookShelf97.

Relevant terminology for the settings gathering method:

RegEdit—RegEdit.exe is located in C:\Winnt. RegEdit is the primary method of looking at what is in the system registry. The main sub-trees you will care about are HKEY_LOCAL_MACHINE\Software and HKEY_CURRENT_USER\Software. You can navigate these trees through a normal tree control interface. "Keys" are registry entries that hold other entries; "Values" are registry entries that hold a piece of data. The valid Value types are String, Binary and DWORD. String and DWORD values are easy to read, but Binary values will be difficult to interpret as they frequently contain many settings in one Value. The registry can be searched using the Edit -> Find menu option.

Regmon—Regmon is available from www.sysinternals.com, if not already installed on your PC. Regmon will monitor all registry activity, which can be very overwhelming. To prune down all this information, you will want to filter out all the other applications. To do this, you must look for the application in the "process" column. It will look like "winword.exe:350", so go to the Edit -> Filter/Highlight menu option and put "winword*" in the include box and click "apply". This will now only show winword* registry activity. If this is still too much data to wade through you may also want to show only writes to the registry; do this by unchecking the "Log Reads" cheekbox on the Edit -> Filter/Highlight dialog box.

Filemon—Filemon is also available from www.sysinternals.com. Filemon monitors all file systems activity. Filemon's interface is almost identical to Regmon, and like Regmon you will likely be overwhelmed with data. To limit the data, you should tell Filemon to only include the application you want to monitor. You can do this by going to Edit -> Filter/Highlight menu item and entering the name off the app to monitor into the Include box (like "winword*"®) then click apply. Like regmon you can also select to only see writes by unchecking the "Log Reads" checkbox on this same dialog.

ART—Advanced Registry Trace is available from http://www.elcomsoft.com/art.html, if not already installed on your PC. ART basically facilitates doing a registry diff. It allows you to take a snapshot before you do something to the registry and then after and then compare the two.

Instmon—InstMon is part of the NT® Server Resource Kit. You will have to install the resource kit to get Instmon. To install a package with Instmon, you just have to give the Instmon program the location of the new package's setup executable. For instance, "C:\NTResKit\InstMon\Installer.exe Office2k D:\Setup.exe". Once the product is installed, there will be a .IML file that has all the information about the install in it (Office2k.IML, for the example above). You can then run ShowInst ("ShowInst Office2k" for the example above) to see the resulting changes from the install.

XML tag glossary—As with any XML product, a defined set (glossary) of relevant tags are produced; in this case to support the XML directives.

The following description provides parameters for "Login/Session Management"(including security)

Terminology:

SessionID—A unique one-time limited-use key that allows a user to access the present invention system. It is tied to the IP Address of the user, so part of the process of validating a SessionID is to make sure that the IP Address/SessionID pair in the Session table match up.

Action Status—Variable that helps the actionmanager.asp page control which ASP methods are called Note: Items in italics indicate potential WAF method calls that are invoked for a given item. The parameters are ASP variables that have been populated from the Request object.

1) The login process for a new user (the first time they hit the website) is as follows:

The user enters the website and is directed to the Login page.

The user enters their username, password, confirm their password, and email,

The system passes the information entered by the user on to the Decision page and sets the Action Status to "New Login".

Because the user is not logged in yet, they are assigned a SessionID of −1.

The system checks to see if it can find a SessionID using the username and password that the user typed in. GetUserInformation(m_Username, m_Password)

This is a new user, so no SessionID will be found.

The system checks to see if the current SessionID is valid. It will not be valid, because it is empty. ValidateSession (m_SessionID)

Because the SessionID is invalid, and the Action.Status is "New Login", the system creates a new account for the user. CreateAccount(m_Username, m_Password, m-PasswordConfirm, m_Email)

The user should now have an existing account, so then the system tries to log them in. Login(m_Username, m_Password)

When the login occurs, the system creates a new unique SessionID. It also determines the user's IP Address and associates it with the newly created SessionID. The SessionID is then returned to the user.

The SessionID is passed to every subsequent page thereafter, which the system uses to authenticate the user.

If the user is inactive for too long of a period of time, their SessionID expires (The current timeout is set to 1 hour). The next time they try to perform an action, they will be informed that their session has timed out and must login again. If the user reaches the PostLoad or PostUnload page, they are automatically logged off of the website, thus destroying their SessionID.

If the user wishes to, they can log off of the website at any time by clicking the Logoff button. This returns them to the Login page.

2) The login process for an existing user (one who has an account, but no active SessionID) is as follows:
   The user enters the website and is directed to the Login page.
   The user enters their username and password.
   The system passes the information entered by the user on to the Decision page and sets the Action Status to "Login".
   Because the user is not logged in yet, they are assigned a SessionID of −1.
   The system checks to see if it can find a SessionID using the username and password that the user typed in. GetUserInformation(m_Username, m_Password).
   The user might have an old SessionID in the system, or if they finished their last session and logged off, there will be no SessionID.
   The system checks to see if the current SessionID is valid. It will not be valid, because it is either empty, expired, or came from another IP Address. ValidateSession (m_SessionID)
   Because the SessionID is invalid, and the Action Status is "Login", the system tries to log the user in. Login (m_Username, m_Password)
   When the login occurs, the system creates a new unique SessionID. It also determines the user's IP Address and associates it with the newly created SessionID. The SessionID is then returned to the user.
   The SessionID is passed to every subsequent page thereafter, which the system uses to authenticate the user.
   If the user is inactive for too long a period of time, their SessionID expires
   (The current timeout is set to 1 hour). The next time they try to perform an action, they will be informed that their session has timed out and must login again. If the user reaches the PostLoad or PostUnload page, they are automatically logged off of the website, thus destroying their SessionID.
   If the user wishes to, they can log off of the website at any time by clicking the Logoff button. This returns them to the Login page.
3) When a user refreshes the Decision page:
   The system sets the SessionID to −1.
   The system checks to see if it can find a SessionID using the username and password that the user typed in on the Login page. This information is available only on the Decision page, because it exists in the Form data. GetUserInformation(m_Username, m_Password)
   Since the user had already loaded the Decision page, there should be an existing SessionID from the current IP Address.
   The system checks to see if the SessionID is valid. It will not be valid if the SessionID has expired, otherwise it should be valid. ValidateSession(m_SessionID)
   If the SessionID is expired, the user is redirected back to the Login page. They then follow the login process for an existing user (Section 2).
4) When a user refreshes any page, except for the Decision page:
   The SessionID on the current page should have been passed from the previous page.
   The system checks to see if the SessionID is valid. It will not be valid if the SessionID has expired, otherwise it should be valid. ValidateSession(m_SessionID)
   If the SessionID is expired, the user is redirected back to the Login page. They then follow the login process for an existing user (Section 2).
5) When a user points 2 browsers to the website from the same machine:
   The website does not distinguish between the 2 instances of the browser since they are both coming from the same IP Address.
   Both browsers can use the same SessionID.
6) When a user closes their browser without logging off and then returns to the website from the same computer-based device while their SessionID is still valid:
   The first page that gets validated is the Decision page.
   The website treats this case the same as if the user hits refresh on the Decision page (Section 3)
7) When a user closes their browser without logging off and then returns to the website from a different computer-based device while their SessionID is still valid:
   The first page that gets validated is the Decision page.
   This case is covered in the login process for an existing user (Section 2).
8) When a user uses the Forward/Back buttons to navigate the website:
   The only page that ever expires is the Decision page, and it expires immediately every time. This means that if you leave it and come back, you must refresh it to view the page.
   If a user's SessionID expires, they can still navigate to pages they have already been to via the Forward/Back buttons. When the user attempts to perform an action, their expired session is detected, and the user must login again.

Dishonest users—The following describe basic methods to prevent various malicious or improper attempts at accesses to the user info stored within the system (e.g., the binary database). These methods are not to be considered all encompassing, but rather illustrative of possible scenarios:
1) A user could try to use the CAD ActiveX control to retrieve settings they don't own:
   All the methods on the CAD that transfer files take a SessionID as a parameter.
   If the CAD is not invoked with a valid SessionID that maps to the current IP Address, the method will fail.
2) A user could try to use the SMOD Server object to retrieve settings they don't own:
   All the methods on the servers that transfer files take a SessionID as a parameter.
   If the SMOD is not invoked with a valid SessionID that maps to the current IP Address, the method will fail.
3) A user could try to steal someone else's Username/Password.
   The only login/session management item passed from page to page in the website system is the SessionID.
   If a user leaves their computer-based device and another user does a "View Source", the only login/session management item that is revealed is their current SessionID.
4) A user could try to access the BDS directly to retrieve settings they don't own:
   All user data files stored on the server are given unique names that have nothing to do with their contents. It would be difficult (but not impossible) to guess a valid IMP filename.
   The BeginTransfer method of the BDS takes a SessionID as a parameter. This method is the main point of entry to the BDS data files.
   The BDS directory is protected by a Username/Password that must be used to invoke any BDS methods. Only the CAD and SMOD objects should know the Username/Password, but it is just another level of security.

Figure 10:
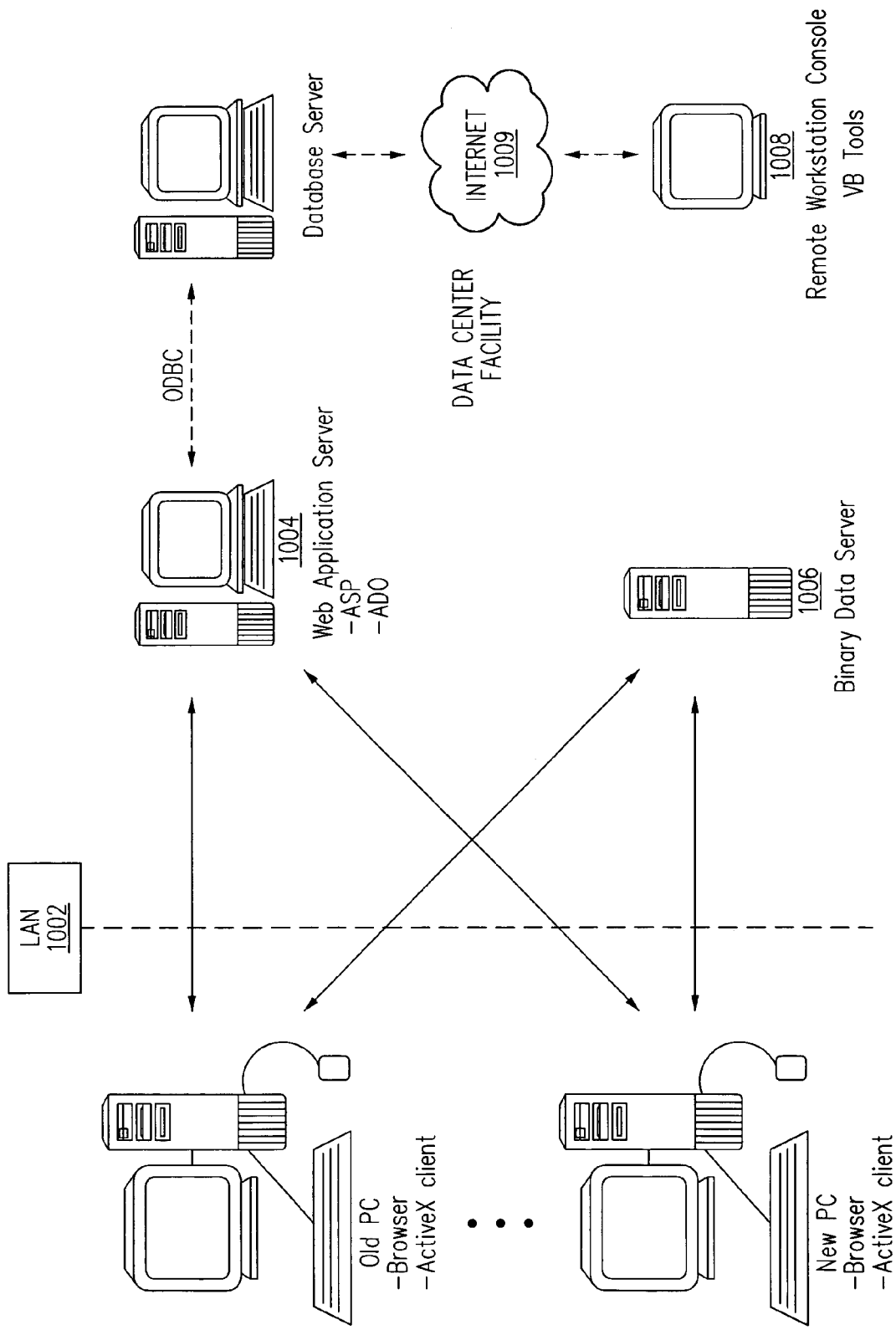
FIG. 10 is a diagrammatic illustration of the architecture of the present invention in an enterprise or industrial embodiment.

FIG. 10 illustrates an enterprise embodiment of the present invention. One major concern businesses have is security. In the enterprise embodiment, the storage of the settings, data, files, etc. (van) 1006, is moved within electronic boundaries controlled by the business. In this figure, the basic elements of the system remain the same, however the computer-based devices are connected over an enterprise internal LAN, WAN, Intranet or virtual network 1002. The HTTP protocol is implemented over the selected network. The Web Application Server is replaced by a company managed Network Application Server 1004. The method of the invention remains essentially the same, modified only by replacing web-based elements with business managed networking elements.

A remote workstation for upgrading, modifying, and/or adding software parameters (e.g., new settings, software versions, etc.) over the Internet 1009, can exist or optionally be moved within the enterprise environment (physically or electronically, i.e., laptop).

Figure 11:
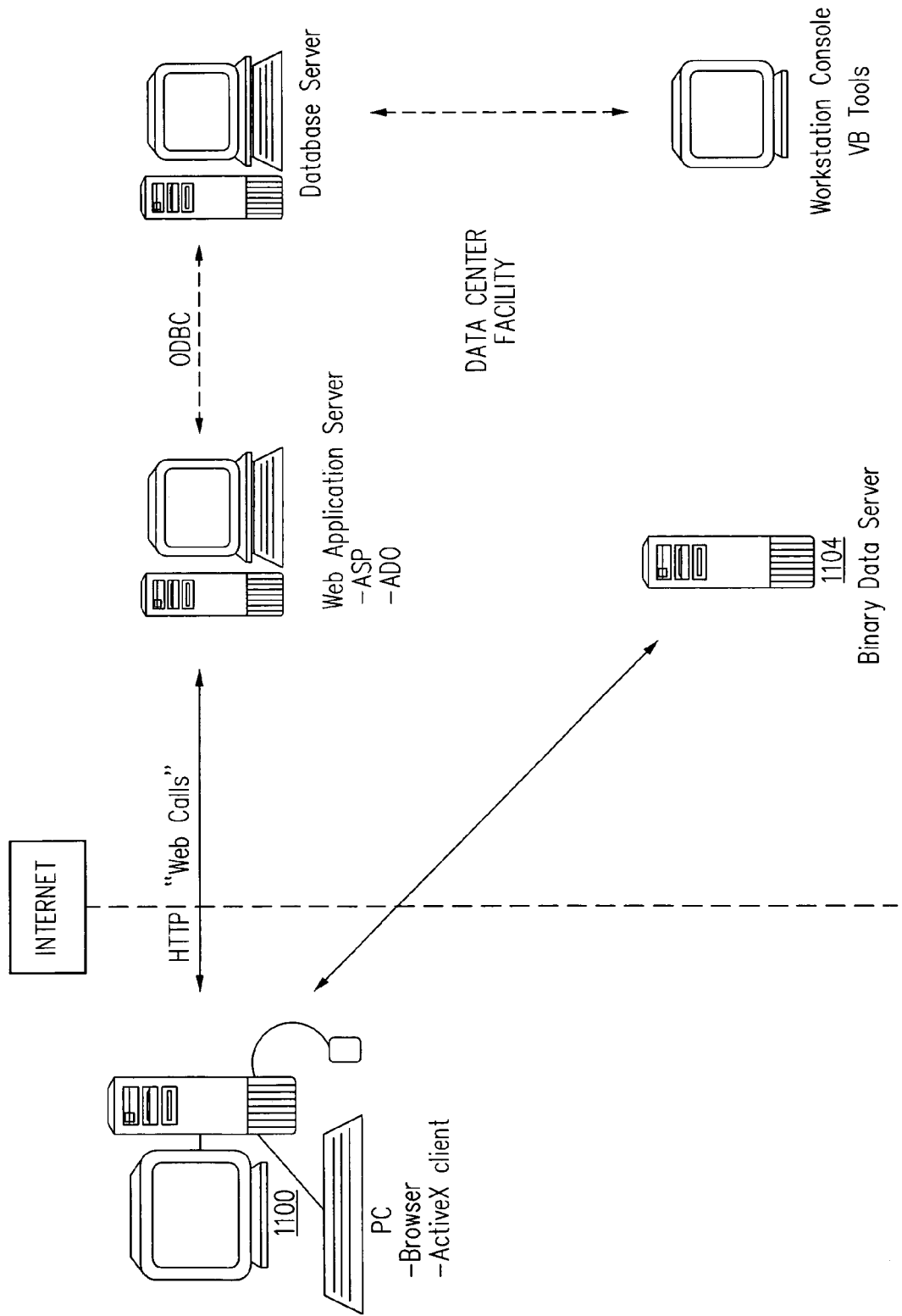
FIG. 11 is a diagrammatic flow diagram illustrating a back-up routine transferring application settings, files, and other data from a first computer-based device onto the web site for temporary storage and returning thereof.

FIG. 11 illustrates a single computer-based user device using the present invention. In this embodiment, the user's PC needs the present invention system and method for the purposes of backing-up and restoring system settings, files and data. A van is created and stored in the Binary Data Server 1104. When the user needs to restore stored information, they simply retrieve and install their stored van.

Figure 12:
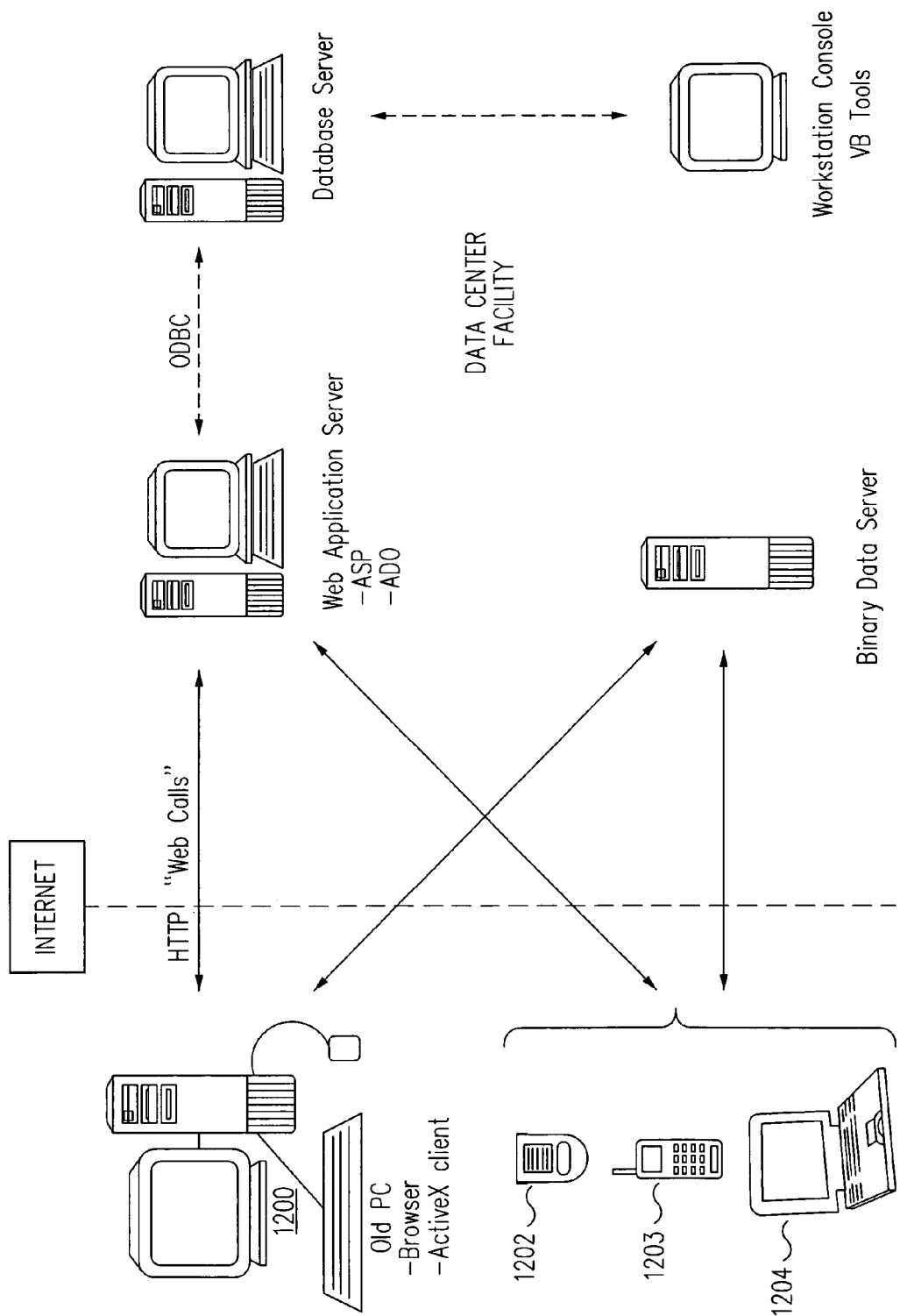
FIG. 12 is a diagrammatic flow diagram illustrating transferring application settings, files, and other data from a first computer-based device onto the web site for temporary storage and returning thereof to one or more second computer-based devices of a differing format.

FIG. 12 illustrates an embodiment, which includes computer-based devices comprising multiple formats, e.g., PC 1200, PDA 1202, telephone 1203, and laptop 1204 using the present invention. In this embodiment, a user who has multiple devices may want to duplicate the "look and feel" across each device. A van is created and stored in the Binary Data Server 1104 for the source device (say PC 1200). Within the system servers, a conversion of the XML directive file into a destination device appropriate format, using tools such as Cocoon (part of Apache's Open Source), is implemented.

Figure 13:
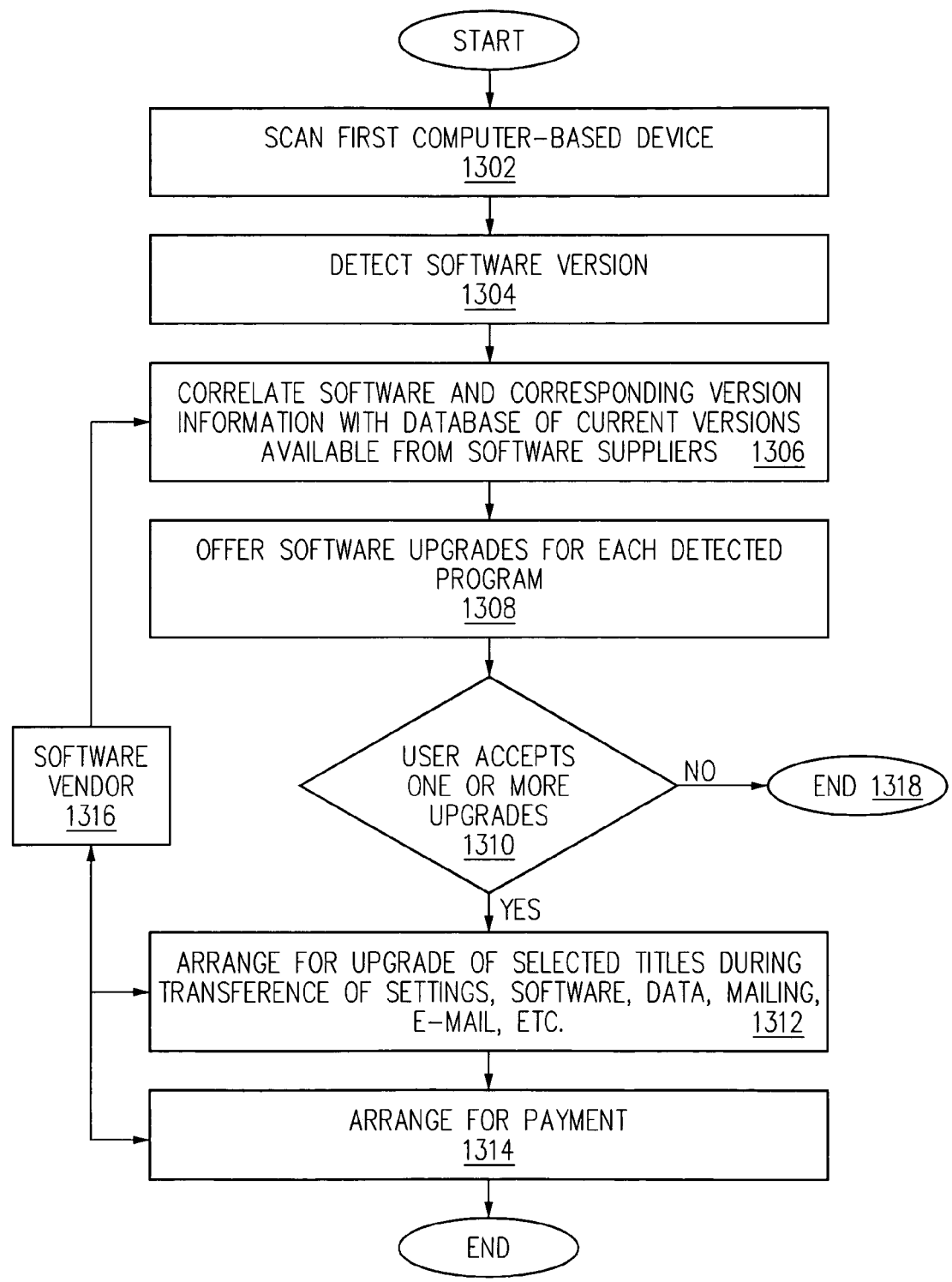
FIG. 13 is a diagrammatic flow diagram illustrating a software version upgrade routine performed during transferring application settings, files, and other data from a first computer-based device to a second computer-based device.

FIG. 13 illustrates an implementation of software version management during the upload/download process (previously discussed above). During the initial scanning 1302 of computer 100, a software version is detected 1304. Using software vendor supplied information 1316, a correlation is performed 1306 to determine if newer versions are available. If so, software upgrades are offered for each detected program 1308. If the user decides against upgrades the process ends 1318, else, they accept one or more upgrades 1310. The upgrades are either downloaded electronically or through more conventional means (i.e., mail). Payment is arranged 1314 and the process is terminated.

WORKING EXAMPLE

A series of screen shots are presented in FIGS. 14–28; these screen shots represent a working example as performed on the website entitled "pcmovingvan". FIGS. 14–23 represent the upload/load portion of the present invention; FIGS. 24–28, the download/unload.

Figure 14:
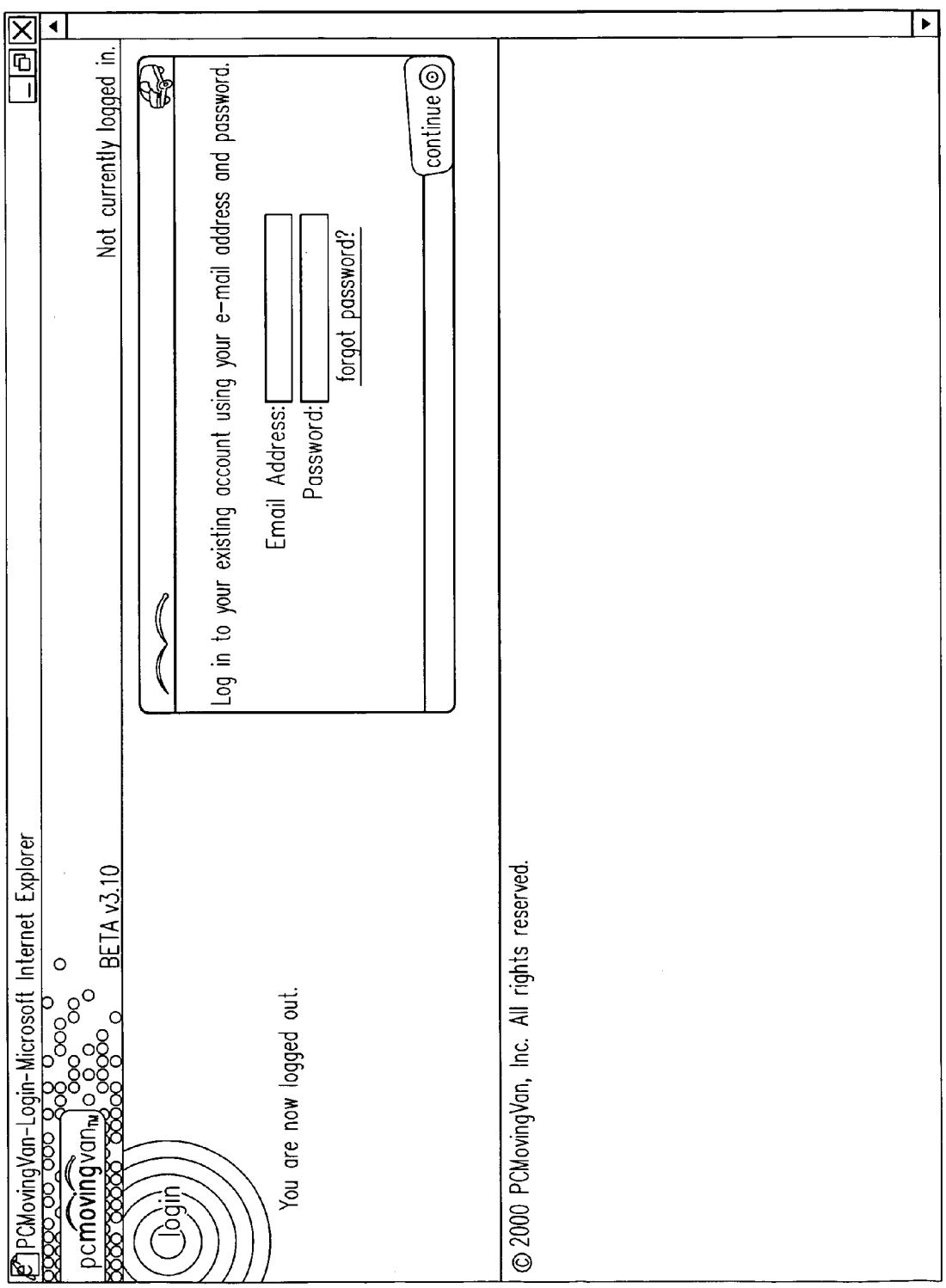
FIGS. 14–28 collectively illustrate, through screenshots, a working example of the present invention.

FIG. 14 illustrates a basic login screen requesting an account holder's e-mail address and password.

Figure 15:
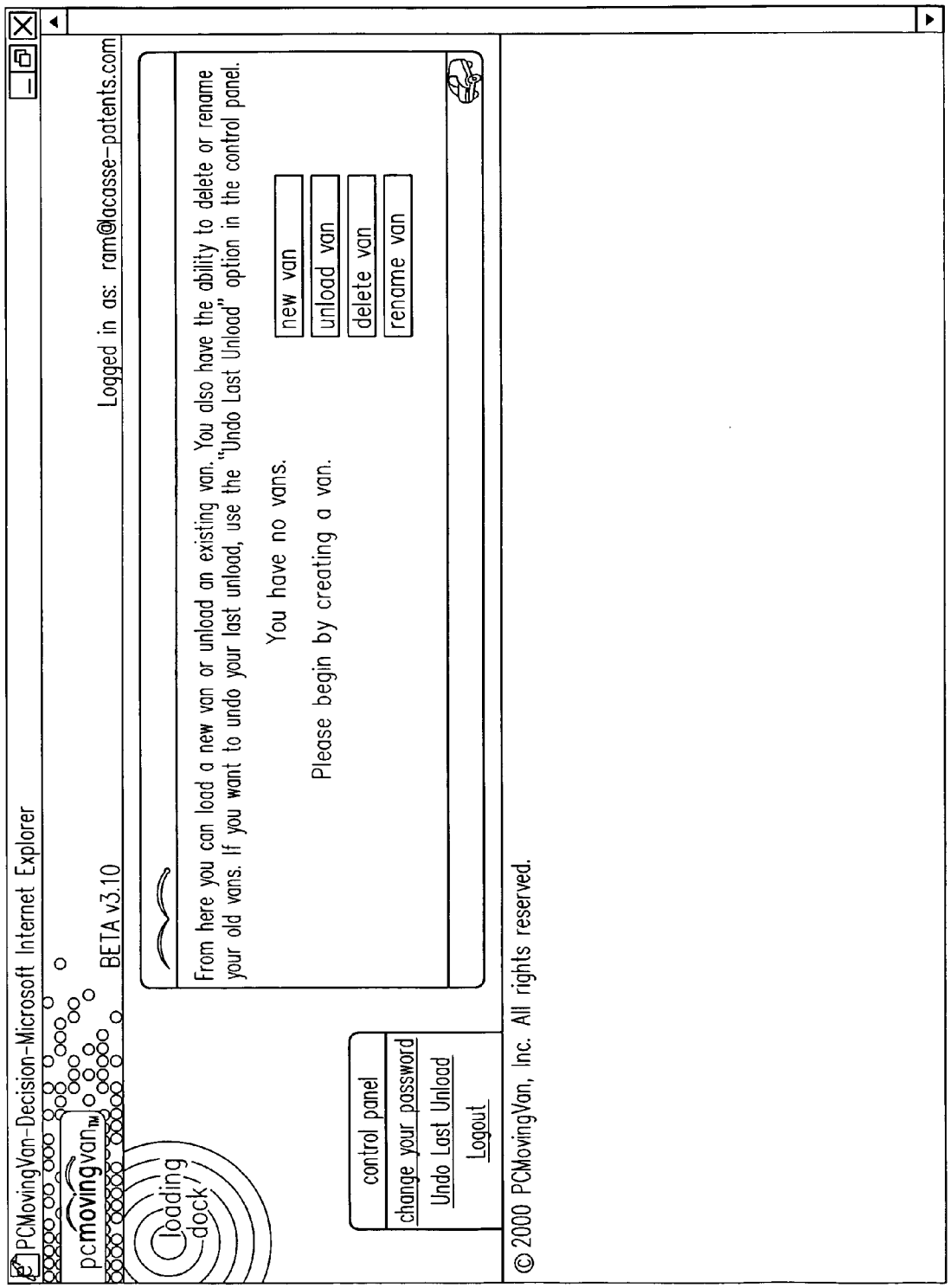

FIG. 15 illustrates an option screen to load a new van, unload an existing van, delete or rename existing vans as well as an undo selection to undo a previous van load.

Figure 16:
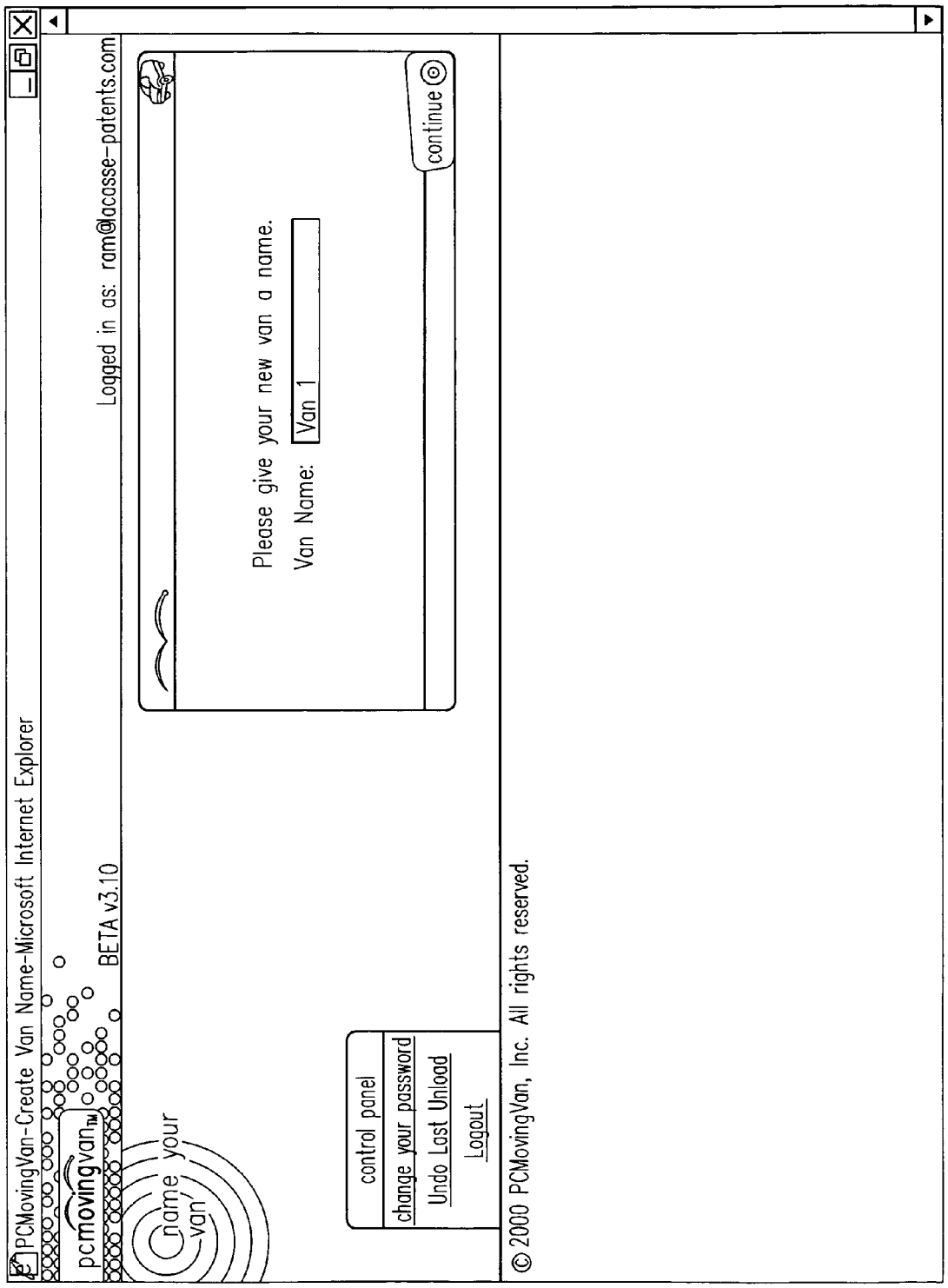

FIG. 16 illustrates an information screen requesting a "name" for the van you are about to create.

Figure 17:
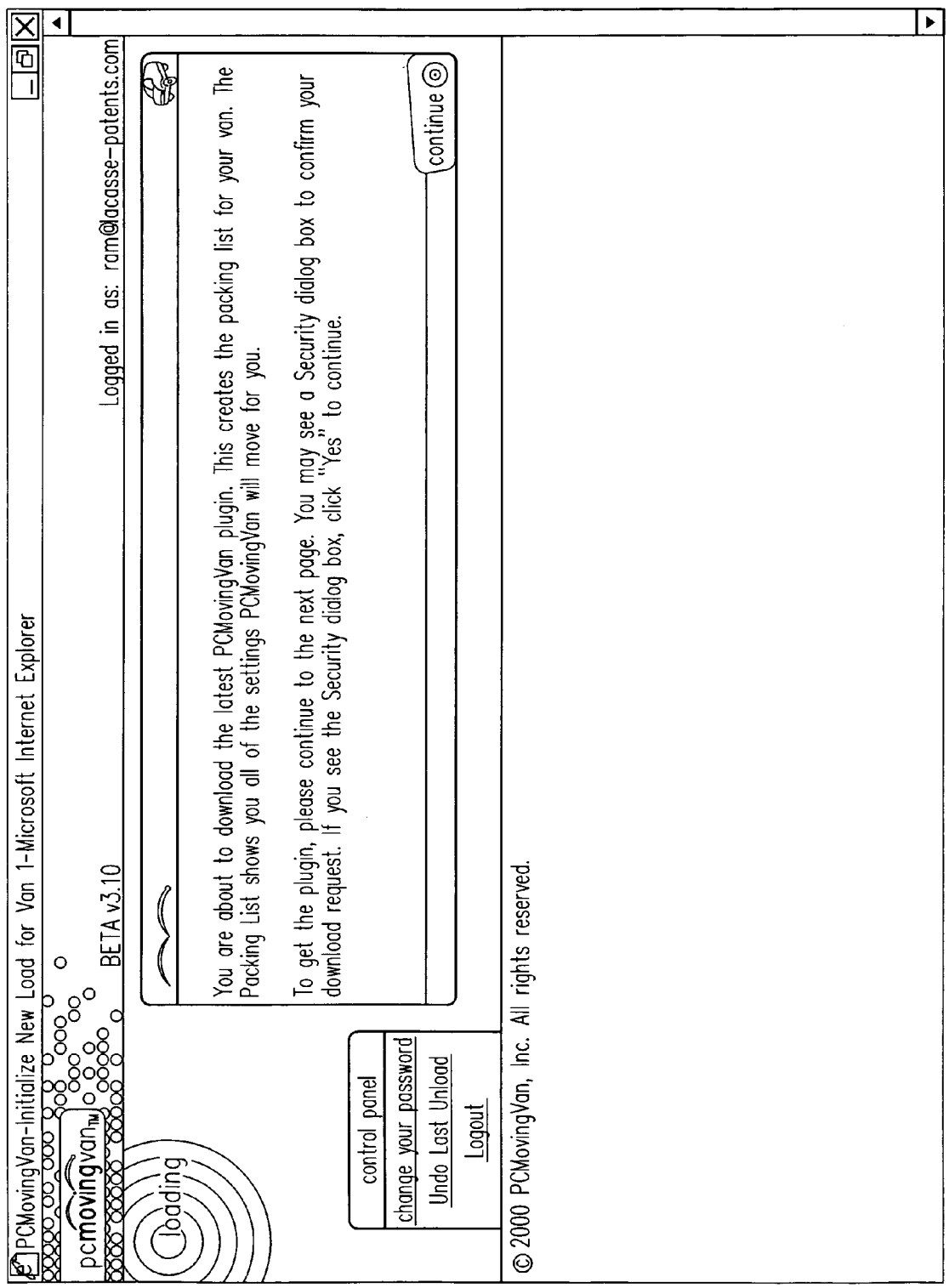

FIG. 17 illustrates an information screen indicating that a plug-in (CAD) will be downloaded to your machine.

Figure 18:
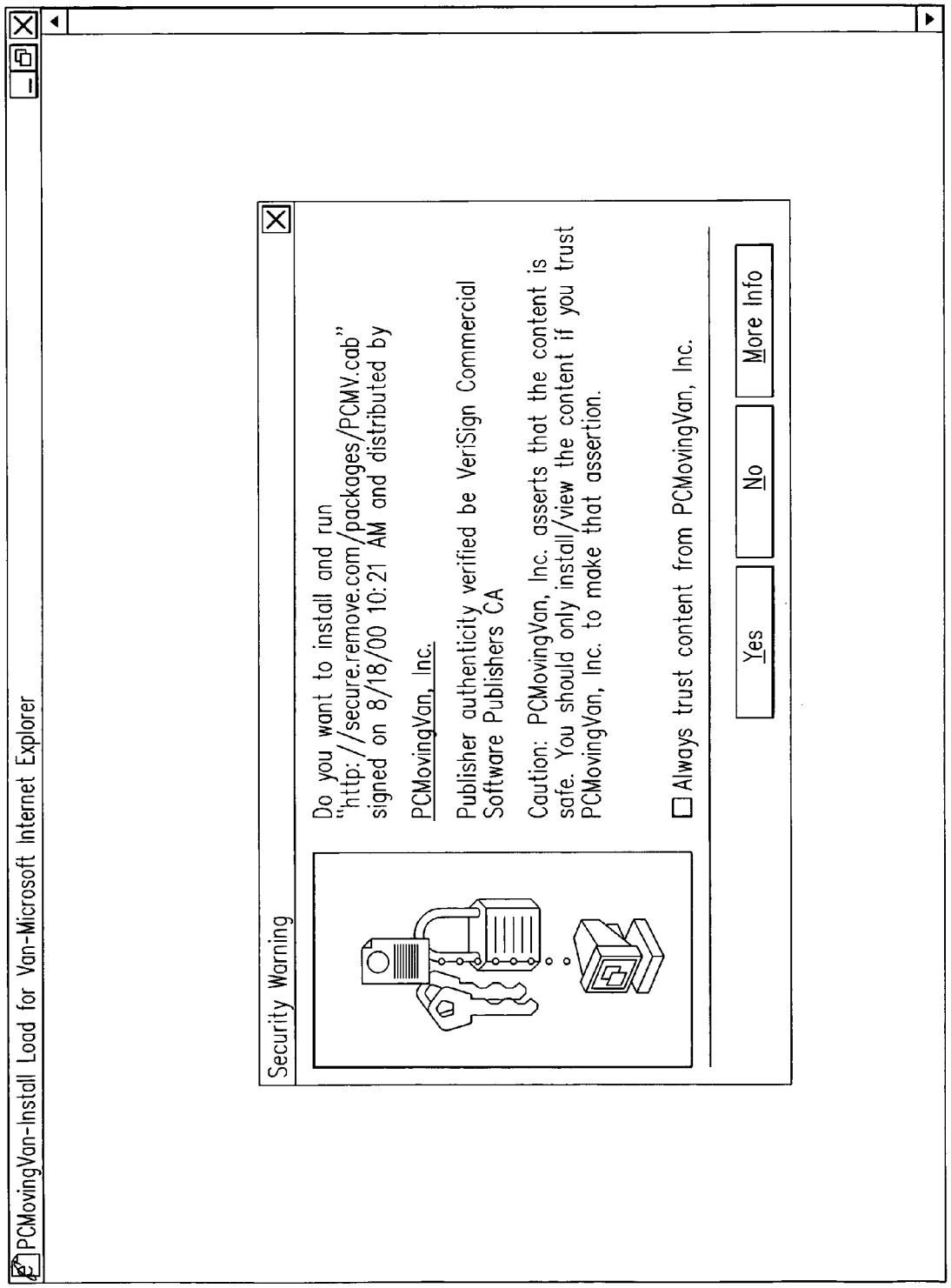

FIG. 18 illustrates an information screen suggesting a security plug-in to secure the data transferred during an existing session.

Figure 19:
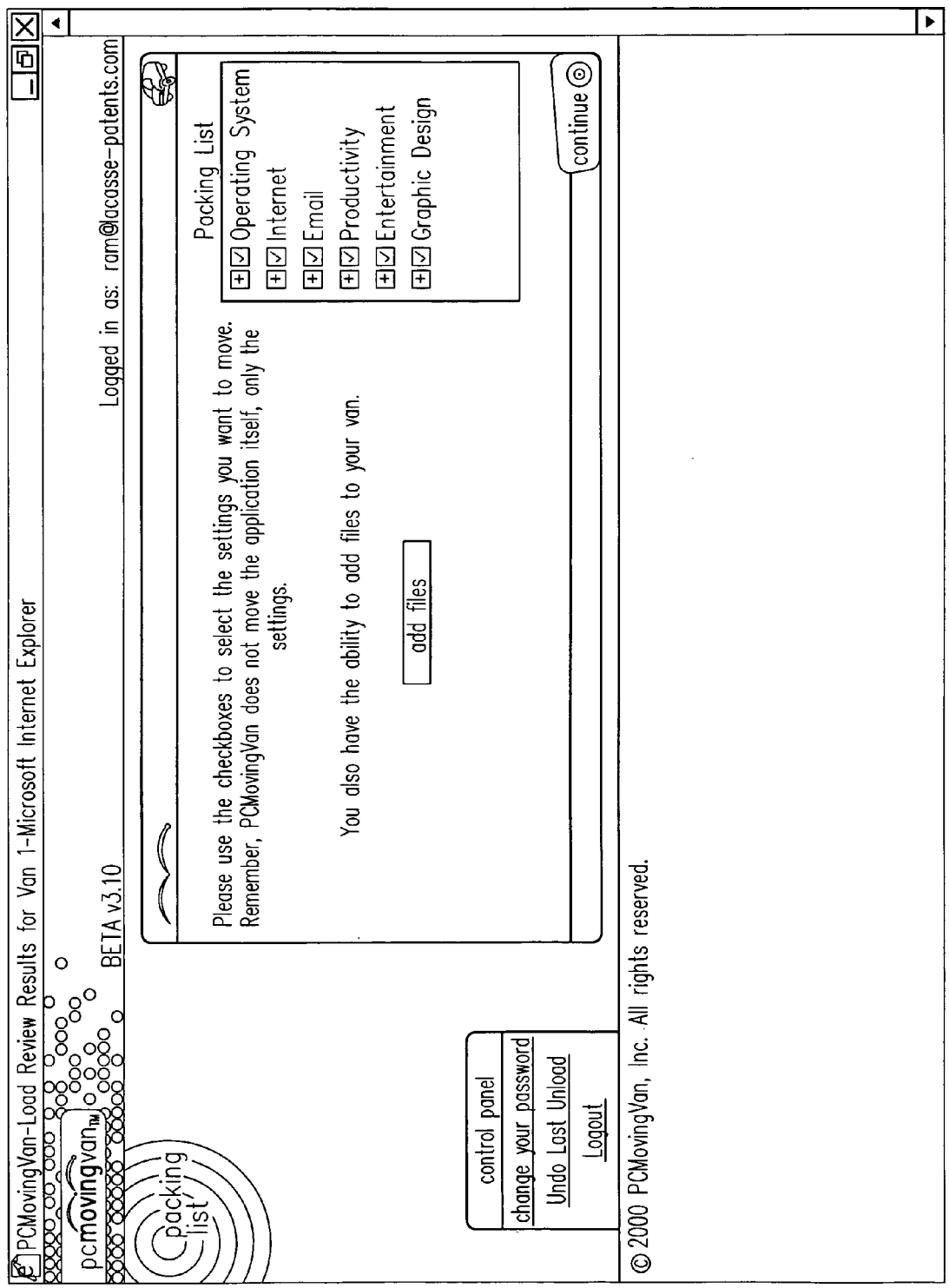

FIG. 19 illustrates a GUI "packing list" for interactive user selection of possible settings and files to be transferred in the user's van.

Figure 20:
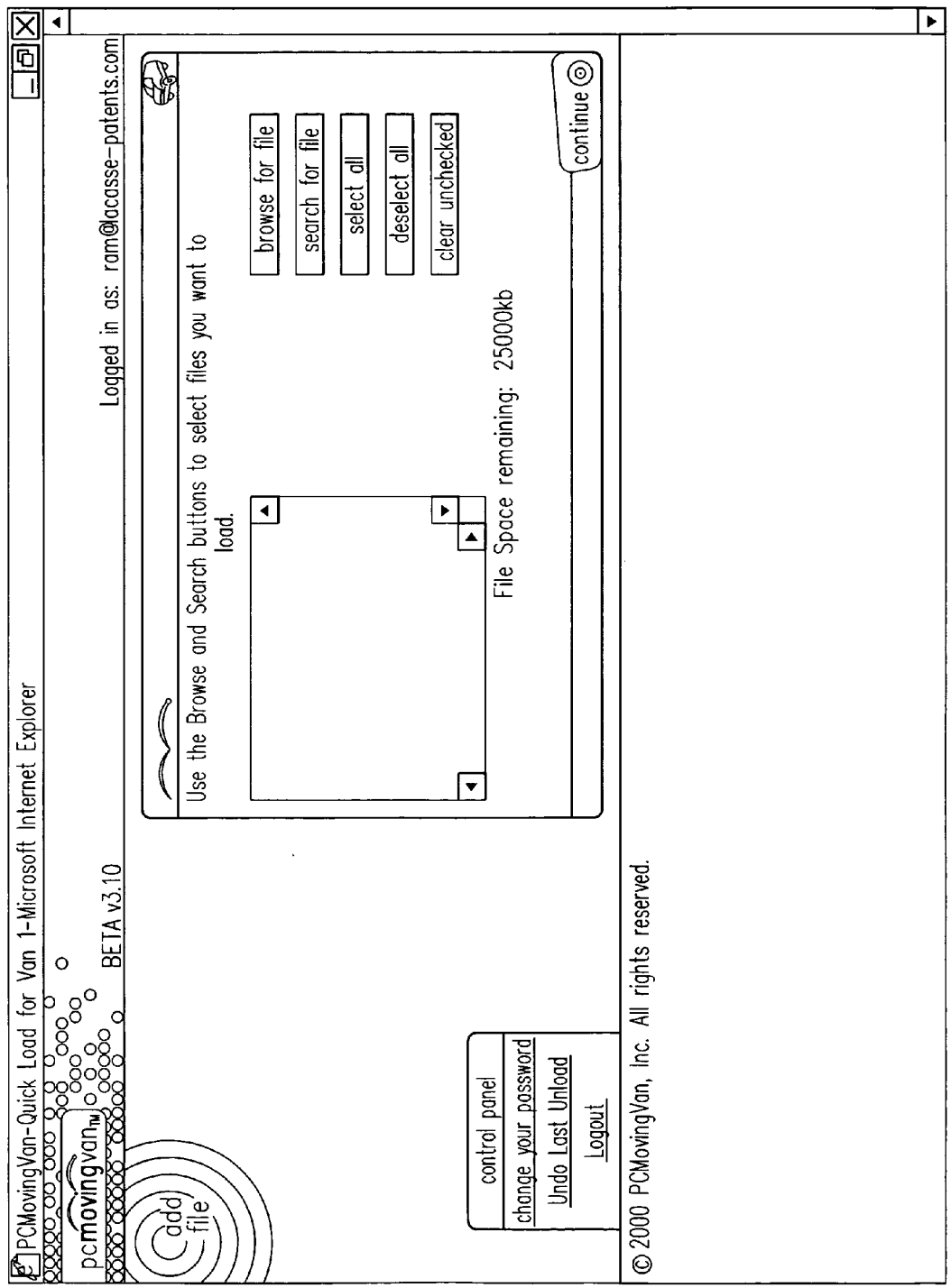
Figure 21:
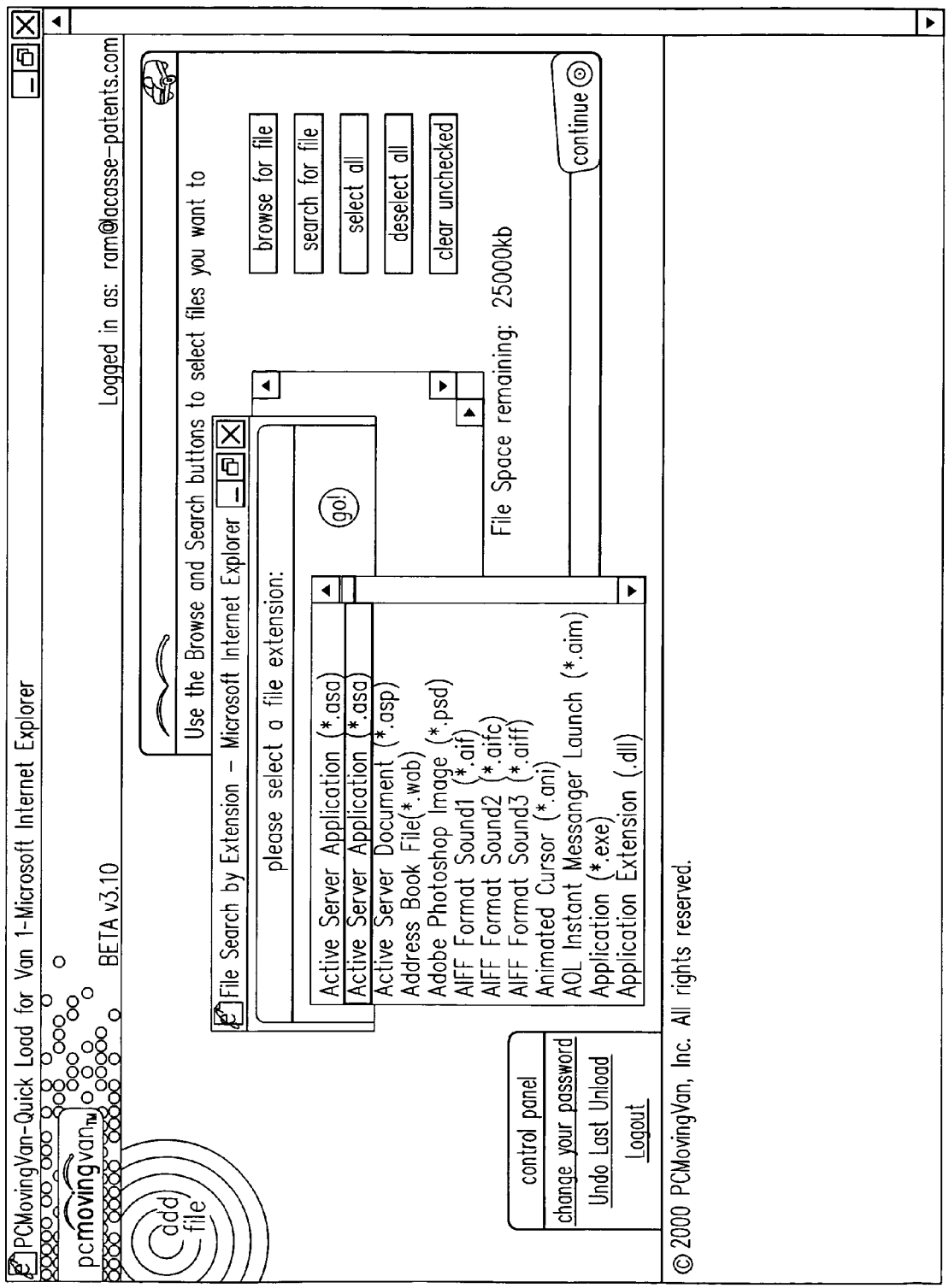

FIGS. 20 and 21 illustrate possible selections for obtaining files to be transferred (if any).

Figure 22:
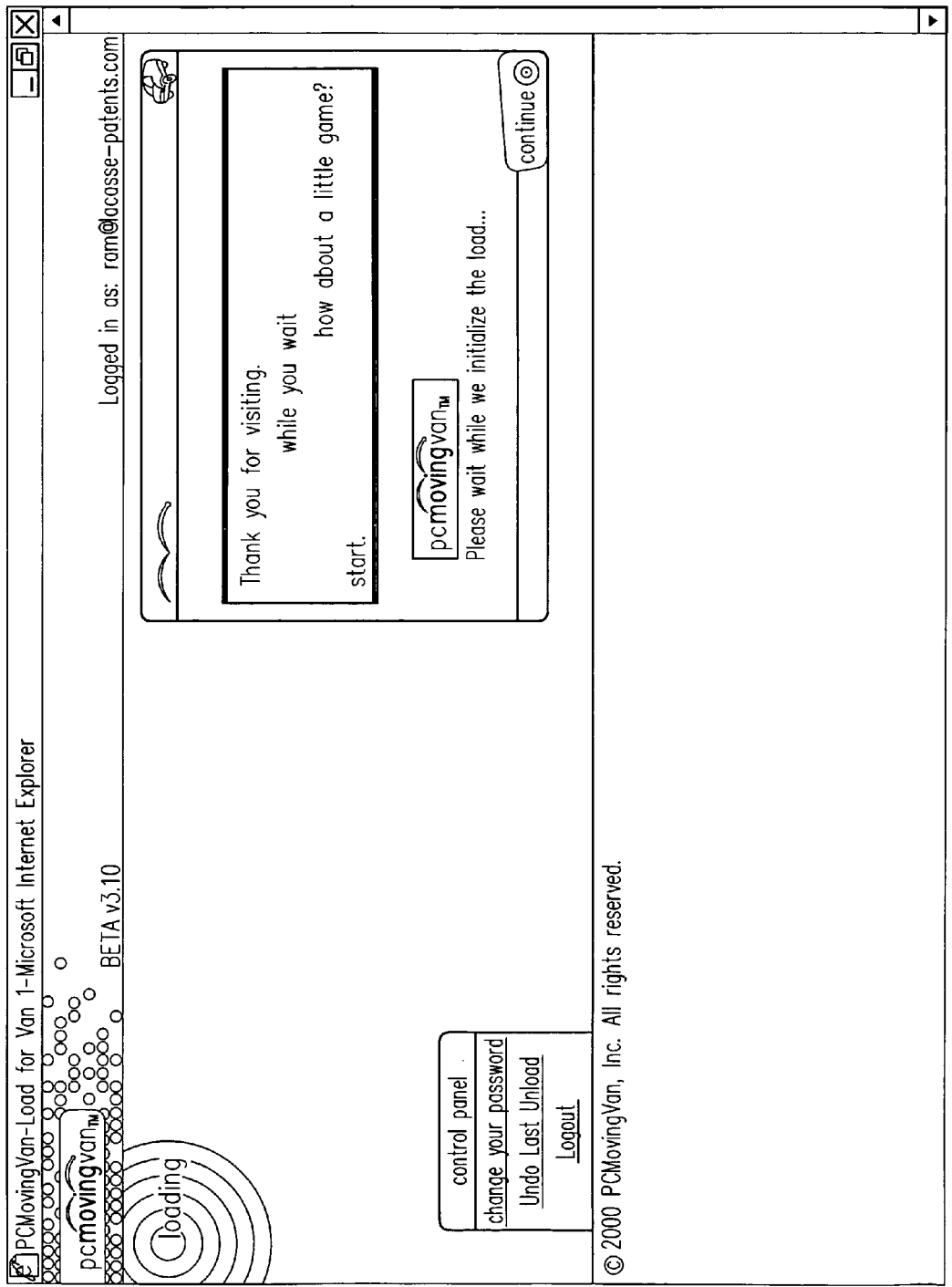

FIG. 22 illustrates an information screen (including status) with a game to pass the time while waiting for the actual van upload. In an alternative embodiment, this section contains directed advertising based on an analysis of the requesting computer.

Figure 23:
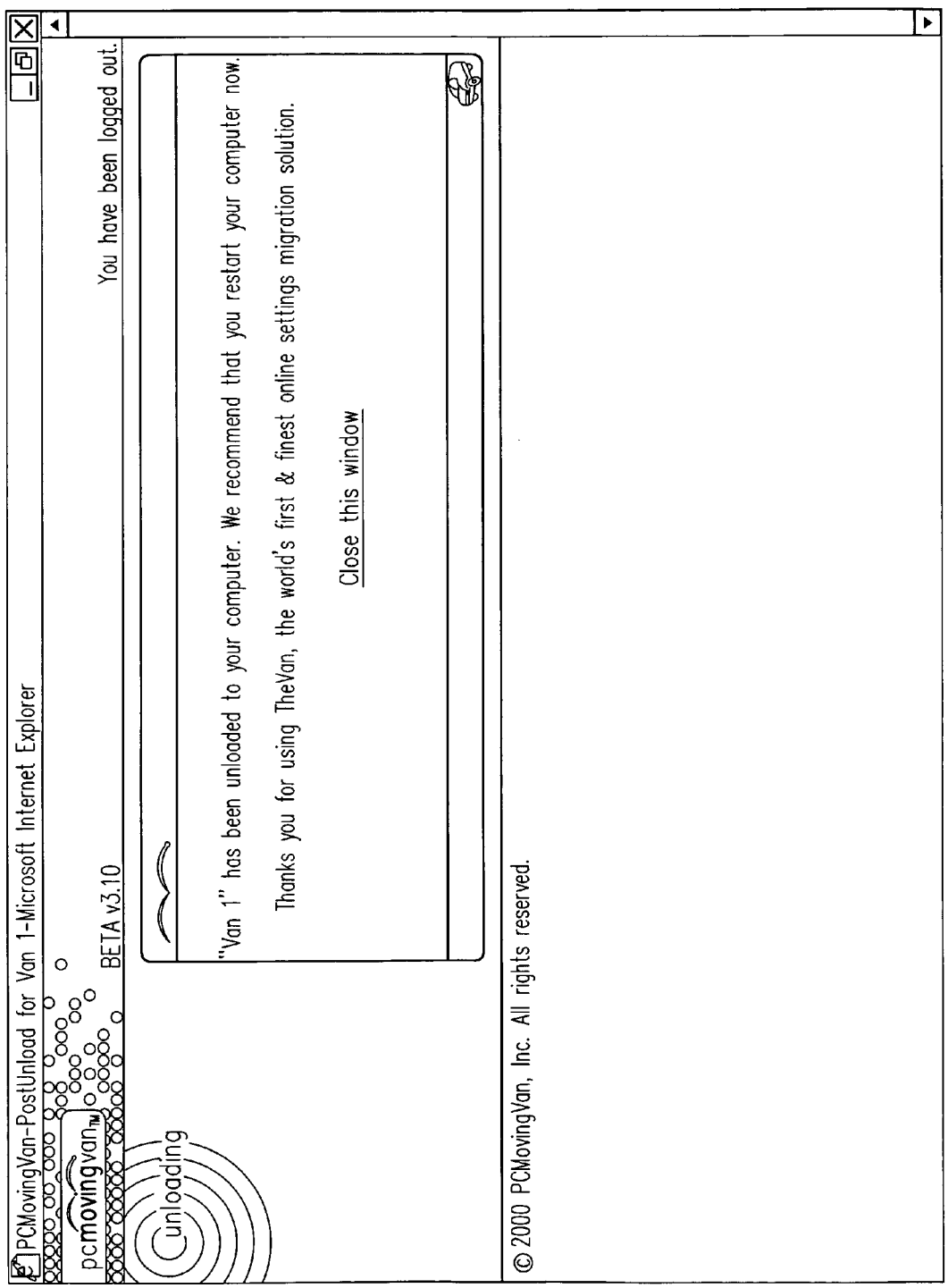

FIG. 23 illustrates an information screen indicating completion of the upload sequence. To now transfer the van to another computer-based device, the user sequences through an unload (after first logging on, as per FIG. 14).

Figure 24:
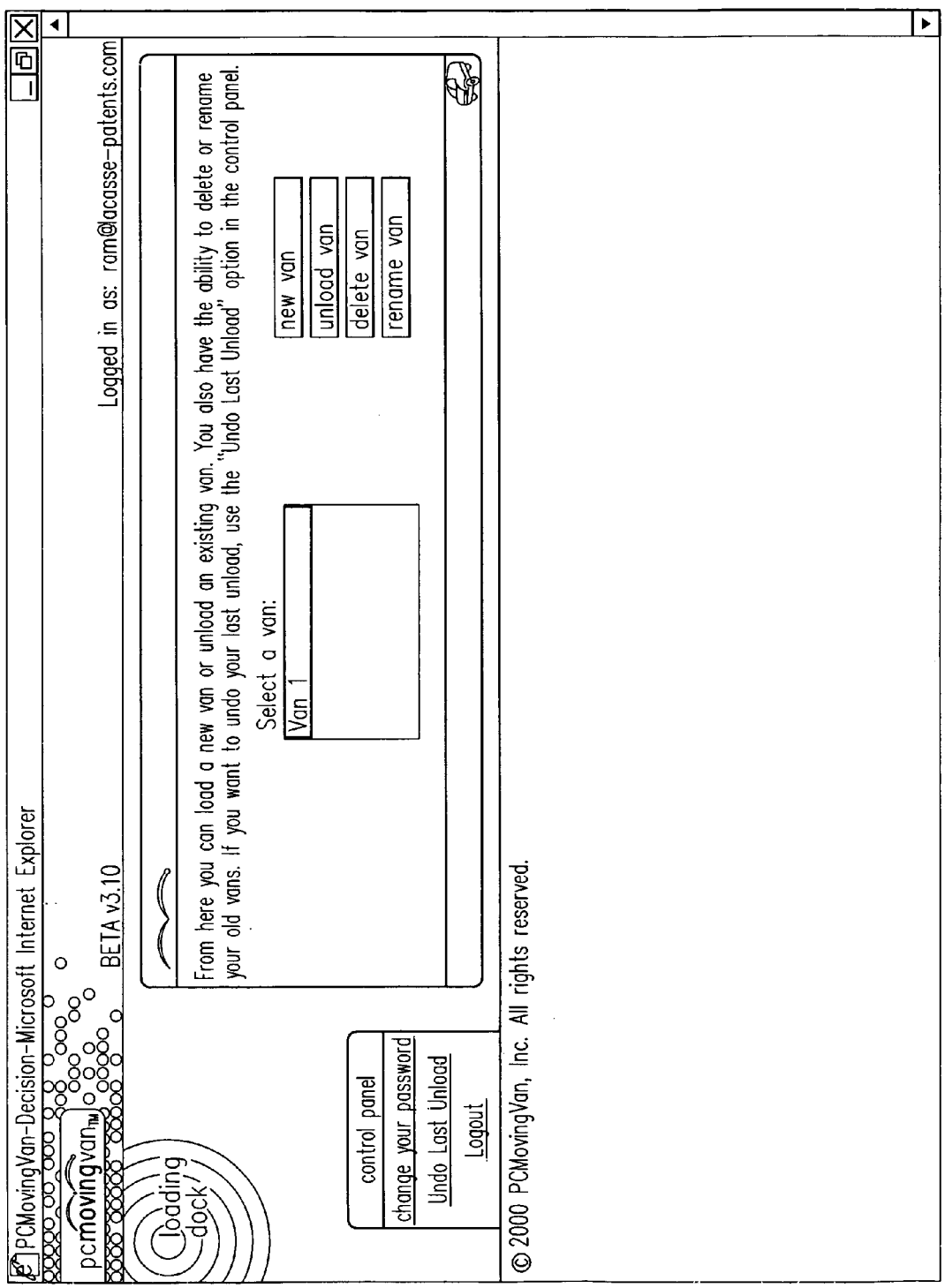

FIG. 24 illustrates an option screen to load a new van, unload an existing van, delete or rename existing vans as well as an undo selection to undo a previous van load (we see the van "van1" created in the upload).

Figure 25:
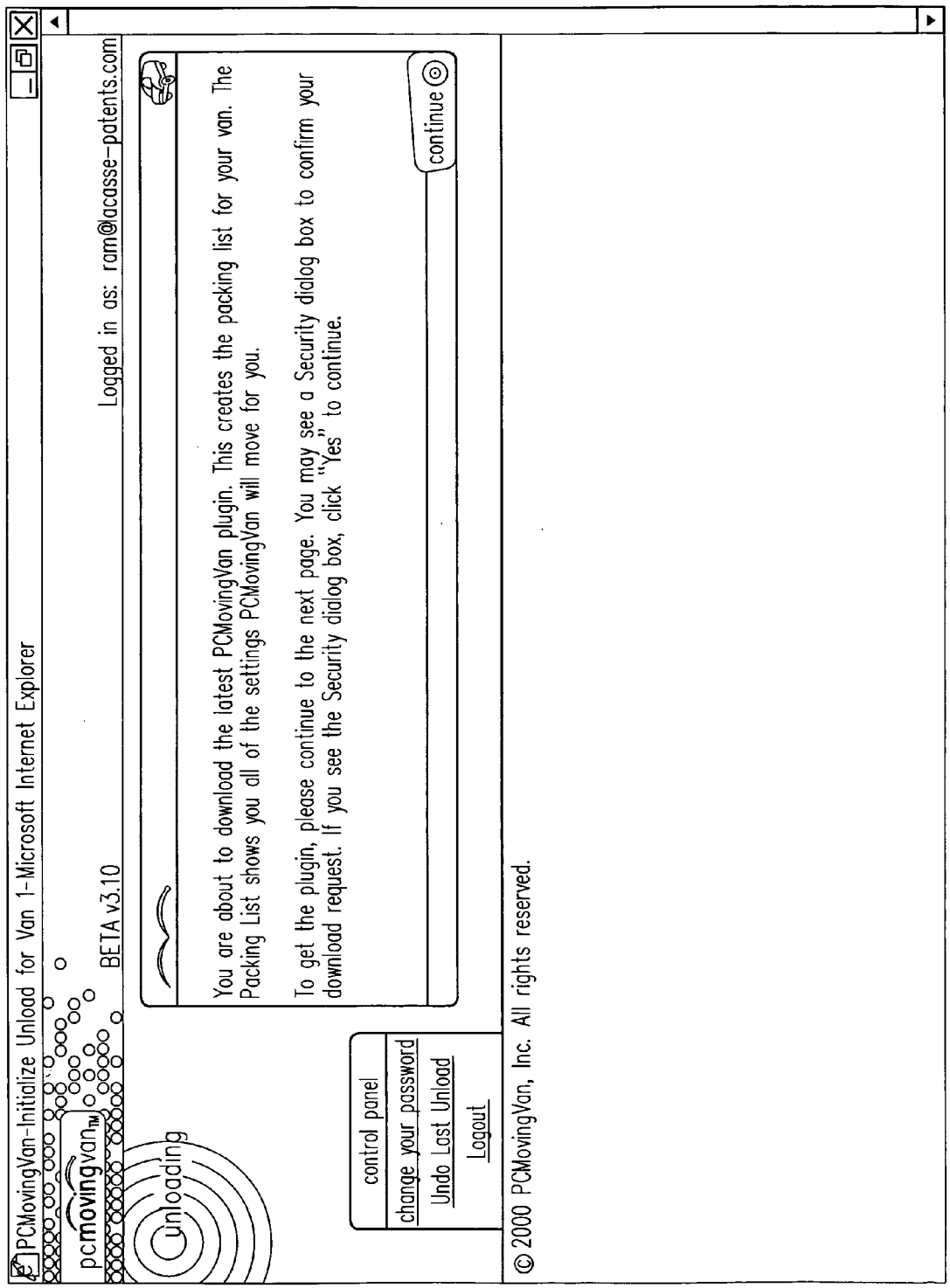

FIG. 25 illustrates an information screen indicating that a plug-in (CAD) will be downloaded to your new device.

Figure 26:
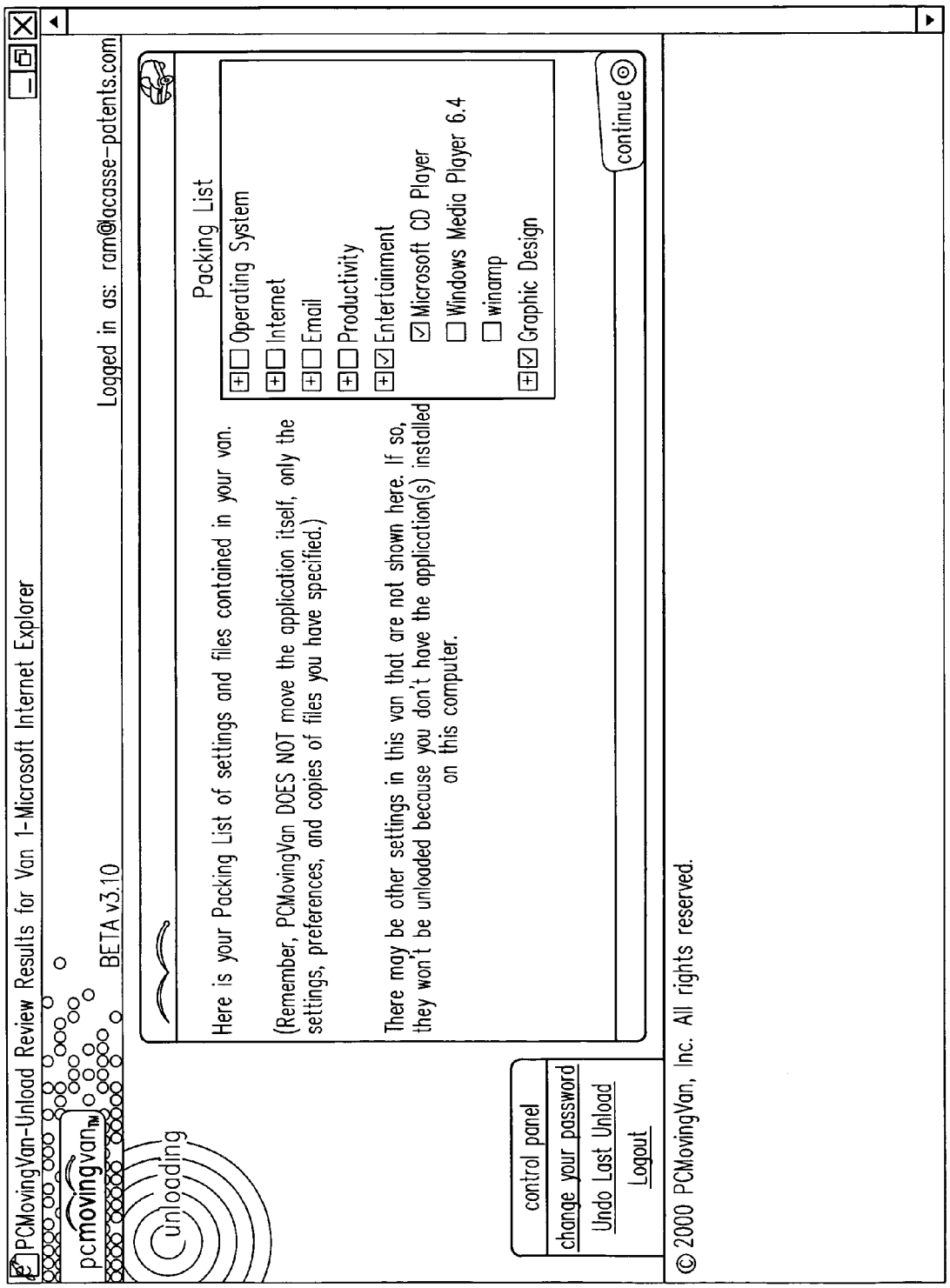

FIG. 26 illustrates a "packing list" of settings and files contained in van 1.

Figure 27:
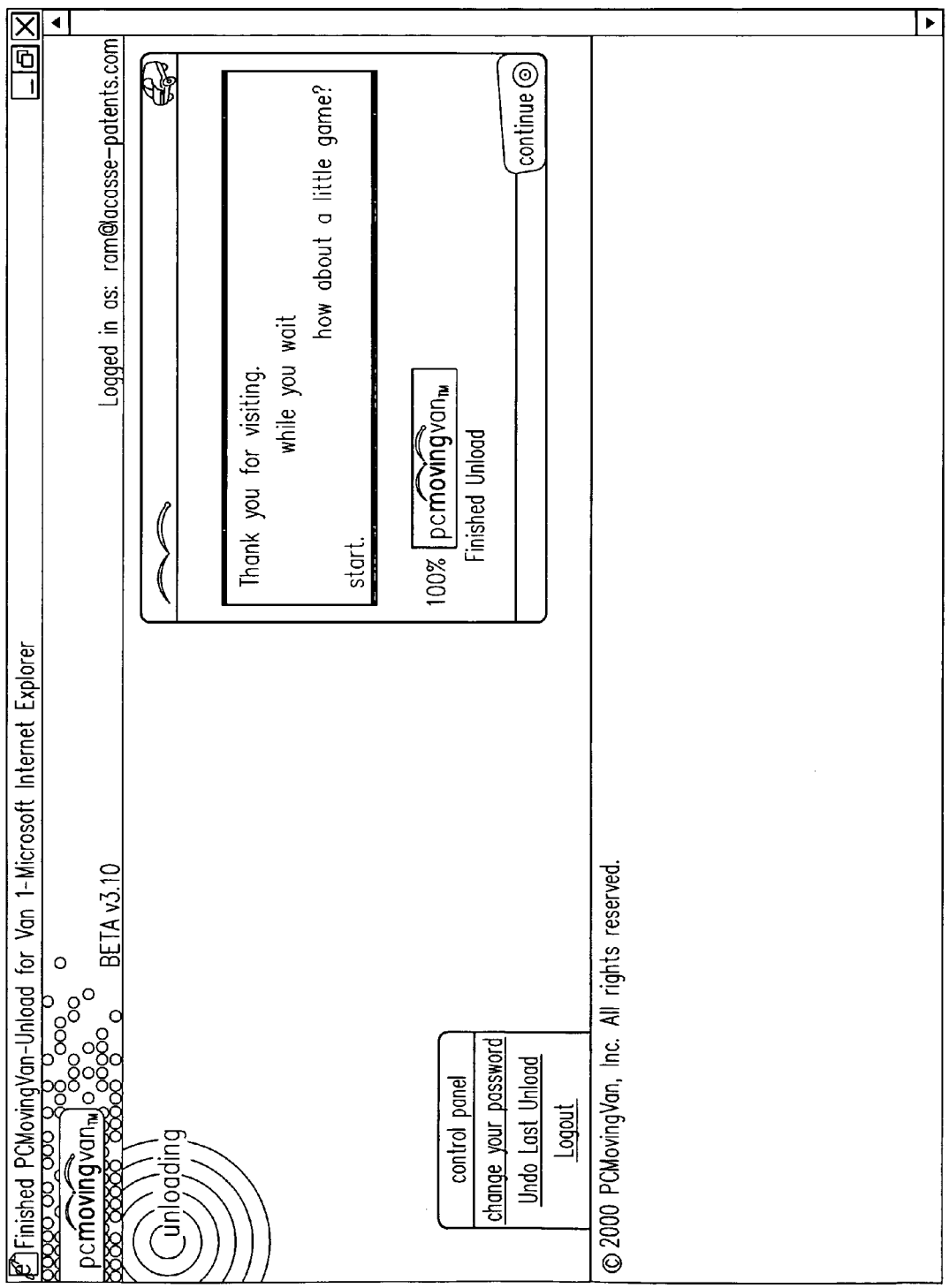

FIG. 27 illustrates an information screen (including status) with a game to pass the time while waiting for the actual van unload. In an alternative embodiment, this section contains directed advertising based on an analysis of the requesting computer.

Figure 28:
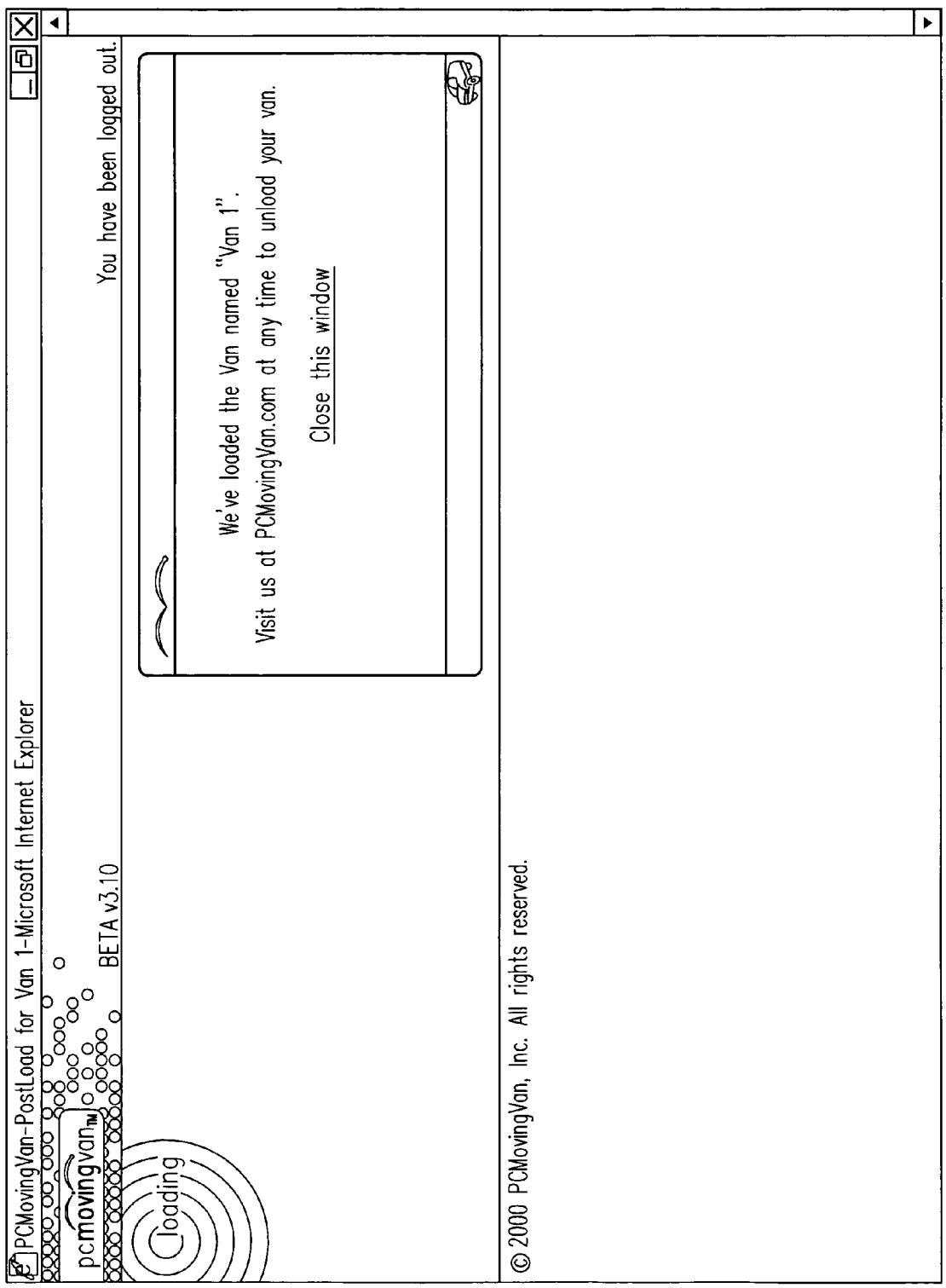

FIG. 28 illustrates a completed van unload and a recommendation to restart the user's PC (not shown—same as FIG.23).

It is to be appreciated that essentially all of the components of the web site of the server system will be comprised of multiple software applications, multiple hardware components and potentially multiple hosting locations as is conventionally done in the industry for web site operation.

It is to be appreciated that the specific time during execution of either the upload or the download routines, that any advertisement(s) and/or offer(s) are presented to the user of the first or second computer-based device can vary from application to application, e.g. the advertisement(s) and/or offer(s) can be presented to the user after the scan of the first or second computer-based device, for example. In addition, a plurality of different advertisement(s) and/or offer(s) can be presented to the user of the first and second computer-based devices during operation of the present invention.

The term "information" as used in the appended claims, is intended to cover the desired applications software settings, file(s) and the data, etc., which are to be conveyed from the first computer-based device to the web site and then from the web site to the second computer-based device.

Since certain changes may be made in the above described method and system for transferring computer-based device software applications, settings and other data from one computer-based device to another computer-based device via a server system of a web site, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The above described invention and its described functional elements are implemented in various computing environments. For example, the present invention may be implemented on a conventional IBM PC or equivalent, multinodal system (e.g. LAN) or networking system (e.g. Internet, WWW, wireless web). All programming, GUIs, display panels and dialog box templates, and data related thereto are stored in computer-based device memory, static or dynamic, and may be retrieved by the user in any of: conventional computer-based device storage, display (i.e. CRT) and/or hardcopy (i.e. printed) formats. The programming of the present invention may be implemented by one of skill in the art of graphics or object-oriented programming.

The main toolsets used for development and construction of a production present invention system are, but not limited to (functionally equivalent programs can be interchanged or added without departing from the scope of the present invention as the exact hardware needs will vary as load testing indicates the capacity of each module. Another consideration is forecasting of the customer base growth rate.):

Visual Basic®6.0 SP3 for creating the administrative and management tools

Visual C++® 6.0 SP3 for creating the CAD

Visual InterDev® 6.0 SP3 for creating the ASP files used by the Web Application Servers Visual SourceSafe® 6.0 SP3 for source and version control Crystal Reportsg® 7 MR1 for creating reports

CONCLUSION

A system and method has been shown in the above embodiments for the effective implementation of a system for transporting application settings, files and other data from one computer-based device to another computer-based device. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program (e.g., ActiveX ATL control), computing environment, specific computing hardware or GUI templates.

We claim:

1. A method for transferring the look and feel of at least a first computer-based device to remote computer-based storage, said transfer across HTTP-based networks, said method comprising:
   a. downloading a software component to manipulate settings;
   b. remotely analyzing said first computer-based device to discover hardware and software settings applicable to said look and feel of said first computer-based device, wherein said settings comprise hardware settings, system settings, attached device settings, application settings, document settings, desktop settings, files, data, e-mail settings, address book settings, bookmarks, and cookies;
   c. listing settings available for transfer;
   d. downloading instructions to said software component to locate, extract and transfer specified settings from said listed settings, and
   e. storing and uniquely identifying said transferred settings in said remote storage.

2. A method for transferring the look and feel of at least a first computer-based device to remote computer-based storage, as per claim 1, wherein said listing of settings includes supplying an HTML document displaying said list.

3. A method for transferring the look and feel of at least a first computer-based device to remote computer-based storage, as per claim 1, wherein said stored settings are retrieved by one or more requesting devices from said remote storage as identified by said unique identification.

4. A method for transferring the look and feel of at least a first computer-based device to remote computer-based storage, as per claim 3, wherein said retrieval by said one or more requesting devices from said remote storage includes repeating a–c for the requesting device.

5. A method for transferring the look and feel of at least a first computer-based device to remote computer-based storage, as per claim 4, wherein said retrieval by said one or more requesting devices from said remote storage further includes: loading and installing on said requesting device a compatible version of said identified stored settings to provide said look and feel of said first computer-based device to said requesting device.

6. A method for transferring the look and feel of at least a first computer-based device to remote computer-based storage, as per claim 1, wherein said HTTP-based network comprises the Internet.

7. A method for transferring the look and feel of at least a first computer-based device to remote computer-based storage, as per claim 1, wherein said HTTP-based network comprises any of the following networks: Internet, LAN, WAN, virtual LAN, wireless web, or telecommunications based.

8. A method for transferring the look and feel of at least a first computer-based device to remote computer-based storage, as per claim 1, wherein said downloaded instructions comprise mark-up based directives comprises any of the following formats: XML, SGML or HTML.

9. A method for transferring the look and feel of at least a first computer-based device to remote computer-based storage, as per claim 8, wherein said mark-up based directives comprise XML tags which are parsed and executed as per said software component during said locating and extracting.

10. A method for transferring the look and feel of at least a first computer-based device to remote computer-based storage, as per claim 1, wherein said at least a first computer-based device comprises one or more of the following: personal computer systems, laptops, portable computers, net devices, palm computers, and Web and WAP phones.

11. A method for transferring the look and feel of at least a first computer-based device to remote computer-based storage, said transfer across the Internet, said method comprising:
   downloading a software component to manipulate settings;
   remotely analyzing said first computer-based device to discover hardware and software settings applicable to said look and feel of said first computer-based device, wherein said settings comprising hardware settings, system settings, attached device settings, application settings, document settings, desktop settings, files, data, e-mail settings, address book settings, bookmarks, and cookies;
   listing settings available for transfer;
   downloading instructions to said software component to locate, extract and transfer specified settings from said listed settings, said instructions comprising one or more parsed XML directives including XML tags identifying at least type and location of desired settings, and storing said transferred settings and a unique identifier across said Internet to said remote storage.

12. A method for transferring the look and feel of at least a first computer-based device to remote computer-based storage, as per claim 11, wherein said stored settings are retrieved by one or more requesting devices from said remote storage as identified by said unique identifiers, said retrieval by said one or more requesting devices from said remote storage including repeating a–c for the requesting device and further including loading and installing on said requesting device a compatible version of said identified stored settings to provide said look and feel of said first computer-based device to said requesting device.

13. A system for transferring across a network, computer-based settings, files, and other data, said system comprising:
   a network server and associated computer storage, said network server receiving requests from one or more computer-based devices for transfer of said computer-based settings, files, and other data;
   at least a first software plug-in, downloadable from said network server to said requesting computer-based device(s);
   one or more mark-up based directive(s) sent from said network server and operative with said downloaded first software plug-in at said requesting computer-based device(s), and
   wherein, in a load mode, said one or more mark-up based directive(s) are parsed and processed by said first software plug-in to return to said associated computer storage, a selected group of settings, files, and other data associated with said requesting computer-based device(s), wherein said settings comprise hardware settings, system settings, attached device settings, application settings, document settings, desktop settings, files, data, e-mail settings, address book settings, bookmarks, and cookies, and in an unload mode, said one or more mark-up based directive(s) are parsed and processed by said first software plug-in to load and install a version of one or more of selected groups stored within said associated computer storage to said requesting computer-based device(s).

14. A system for transferring across a network, computer-based settings, files, and other data, as per claim 13, wherein said network utilizes the HTTP protocol.

15. A system for transferring across a network, computer-based settings, files, and other data, as per claim 13, wherein said network comprises the Internet.

16. A system for transferring across a network, computer-based settings, files, and other data, as per claim 13, wherein said network comprises any of: HTTP based, Internet, LAN, WAN, virtual LAN, wireless web, or telecommunications based.

17. A system for transferring across a network, computer-based settings, files, and other data, as per claim 13, wherein said mark-up based directive(s) comprise any of the following formats: XML, SGML or HTML.

18. A system for transferring across a network, computer-based settings, files, and other data, as per claim 13, wherein use of said mark-up based directive(s) enables intelligent selection of a subset of available settings, files or data.

19. A system for transferring, across a network, computer-based settings, files, and other data, as per claim 13, wherein said one or more computer-based devices include any of the following: personal computer systems, laptops, portable computers, net devices, palm computers, or Web and WAP phones.

20. A system for transferring, across a network, computer-based settings, files, and other data, as per claim 13, wherein, in a back-up mode, a single computer-based device requests the load and, in a restore mode, the unload.

21. A system for transferring, across a network, computer-based settings, files, and other data, as per claim 13, wherein said system enables personal computer upgrades by loading a first older computer's environment comprising said settings, files and other data into said associated storage and thereafter uploading a version of said environment compatible with a new personal computer.

22. A system for transferring, across a network, computer-based settings, files, and other data, as per claim 13, wherein at least one of said one or more mark-up based directive(s) comprises a review directive to analyze existing computer-based settings, files, and other data on said requesting computer-based device.

23. A system for transferring, across a network, computer-based settings, files, and other data, as per claim 13, wherein said system further comprises a converter to translate said stored computer-based settings, files, and other data into various device compatible formats based on said review directive.

24. A system for transferring, across a network, computer-based settings, files, and other data, as per claim 13, wherein at least one of said one or more mark-up based directive(s) provides instructions to said downloaded plug-in to locate and extract computer-based settings, files, and other data from a registry and file system of said requesting computer-based device.

25. A system for transferring, across a network, computer-based settings, files, and other data, as per claim 13, further comprising a graphical user interface for interactively selecting one or more computer-based settings, files, and other data for transfer.

26. A system for transferring, across a network, computer-based settings, files, and other data, as per claim 13, wherein said one or more requesting computer-based devices comprise at least a first and second device with disparate operating systems and said version of one or more selected groups stored within said associated computer storage is selected by said network server to make the unload compatible with the operating system of the requesting device.

27. A system for transferring, across a network, computer-based settings, files, and other data, as per claim 13, wherein said one or more requesting computer-based devices comprise at least a first and second device with disparate formats and said version of one or more selected groups stored within said associated computer storage is selected by said network server to make the upload compatible with the format of the requesting device.

28. A method for transferring information from a first computer-based device to a web site, for temporary storage and for later transfer of the stored information from the web site to a second computer-based device, the method comprising:
   establishing a communication link between a first computer-based device and a web site having a storage capability;
   scanning the first computer-based device, via the web site, to determine the information contained on the first computer-based device, wherein said information comprises hardware settings, system settings, attached device settings, application settings, document settings, desktop settings, files, data, e-mail settings, address book settings, bookmarks, and cookies;

allowing a user to select which of the scanned information, determined by the web site, is to be uploaded from the first computer-based device onto the web site for temporary storage; and transferring the information, contained on the first computer-based device and selected by the user, onto the web site for temporary storage.

29. The method according to claim 28, further comprising:

establishing communication link between a second computer-based device and the web site;

scanning the second computer-based device, via the web site, to determine information contained on the second computer-based device;

displaying the information, from the first computer-based device temporarily stored on the web site, to the user;

allowing the user to select which of the temporary information, from the first computer-based device and stored on the web site, is to be downloaded from the web site onto the second computer-based device; and downloading the selected information from the web site onto the second computer-based device.

30. The method according to claim 29, further comprising, after establishing a communication link but before scanning the second computer-based device, downloading software from the web server to the second computer-based device to facilitate interaction between the second computer-based device and the web site.

31. The method according to claim 29, further comprising storing the information obtained from the second computer-based device, during the scan via the web site, in a database.

32. The method according to claim 29, further comprising providing a message to the second computer-based device to indicate whether the transfer of the selected and temporarily stored information successfully occurred from the personal account of the user at the web site onto the second computer-based device.

33. The method according to claim 28, further comprising, prior to scanning the first computer-based device, having the user to set up a personal account at the web server system; and requiring the user to assign a password to the personal account at the web server system to restricted access to the personal account.

34. The method according to claim 33, further comprising requiring the user to enter account number and password information, prior to the user of the second computer-based device being provided with access to the personal account of the user at the web server system.

35. The method according to claim 28, further comprising, after establishing a communication link but before scanning the first computer-based device, downloading software from the web server to the first computer-based device to facilitate interaction between the first computer-based device and the web site.

36. The method according to claim 28, further comprising storing the information obtained from the first computer-based device, during the scan via the web site, in a data base.

37. The method according to claim 28, further comprising providing a message to the first computer-based device to indicate whether the transfer of the information, selected by the user, successfully occurred from the first computer-based device onto the web site for temporary storage.

38. A system for transferring information from a first computer-based device to a web site, for temporary storage and for later transfer of the stored information from the web site to a second computer-based device, the system comprising:

means for establishing a communication link between a first computer-based device and a web site, the web site having storage means for temporary storage of information;

means for scanning the first computer-based device, via the web site, to determine the information contained on the first computer-based device, wherein said information comprises hardware settings, system settings, attached device settings, application settings, document settings, desktop settings, files, data, e-mail settings, address book settings, bookmarks, and cookies;

means for allowing a user to select which of the scanned information, determined by the web site, is to be uploaded from the first computer-based device onto the web site for temporary storage; and means for transferring the information, contained on the first computer-based device and selected by the user, onto the web site for temporary storage.

39. The system according to claim 38, further comprising:

means for establishing communication link between a second computer-based device and the web site;

means for scanning the second computer-based device, via the web site, to determine information contained on the second computer-based device;

means for displaying the information, from the first computer-based device temporarily stored on the web site, to the user;

means for allowing the user to select which of the temporary information, from the first computer-based device and stored on the web site, is to be downloaded from the web site onto the second computer-based device; and means for downloading the selected information from the web site onto the second computer-based device.

40. The system according to claim 39, further comprising the means for requiring the user to enter account number and password information, prior to the user of the second computer-based device being provided with access to the personal account of the user at the web server system.

41. The system according to claim 39, further comprising, after establishing a communication link but before scanning the second computer-based device, means for downloading software from the web server to the second computer-based device to facilitate interaction between the second computer-based device and the web site.

42. The system according to claim 39, further comprising means for storing the information obtained from the second computer-based device, during the scan via the web site, in a data base.

43. The system according to claim 39, further comprising means for providing a message to the second computer-based device to indicate whether the transfer of the selected and temporarily stored information successfully occurred from the personal account of the user at the web site onto the second computer-based device.

44. The system according to claim 38, further comprising, prior to scanning the first computer-based device, means for having the user set up a personal account at the web server system; and means for requiring the user to assign a password to the personal account at the web server system to restrict access to the personal account.

45. The system according to claim 38, further comprising, after establishing a communication link but before scanning the first computer-based device, means for downloading software from the web server to the first computer-based device to facilitate interaction between the first computer-based device and the web site.

46. The system according to claim 38, further comprising means for storing the information obtained from the first computer-based device, during the scan via the web site, in a database.

47. The system according to claim 38, further comprising means for providing a message to the first computer-based device to indicate whether the transfer of the information, selected by the user, successfully occurred from the first computer-based device onto the web site for temporary storage.

48. A method for transporting over a network, computer-based settings, files, and other data from a first computer-based device to remote computer-based storage, and for later transfer from said computer-based storage to at least a second computer-based device, said method performed using one or more remote servers located within said network, said method comprising:
   a. establishing a communication link between said first computer-based device and at least a first of said one or more remote servers;
   b. downloading at least a first of one or more software programs from said first remote server onto said first computer-based device, said first software program enabling the temporary extraction of one or more of said computer-based settings, files, and other data, wherein said settings comprise hardware settings, system settings, attached device settings, application settings, document settings, desktop settings, files, data, e-mail settings, address book settings, bookmarks, and cookies;
   c. providing a user interface for selecting specific ones of said temporarily extracted computer-based settings, files, and other data for transfer to said computer-based storage;
   d. upon said selection, said first software program executing routines in conjunction with said first remote server to transfer said selection to said computer-based storage;
   e. executing a transfer of said stored computer-based settings, files, and other data to at least a second computer-based device comprising:
   f. establishing a communication link between said second computer-based device and said first remote server;
   g. downloading at least a first of one or more software programs from said first remote server onto said second computer-based device;
   h. said first software program enabling the transfer and installation of one or more of said stored computer-based settings, files, and other data;
   i. providing a user interface for selecting specific ones of said stored computer-based settings, files, and other data for transfer to said second computer-based device;
   j. upon said selection, said first software program executing routines in conjunction with said first remote server to transfer and install said selection to said second computer-based device.

49. A method for transporting over a network, computer-based settings, files, and other data as per claim 48, wherein said communications utilize the HTTP protocol.

50. A method for transporting over a network, computer-based settings, files, and other data as per claim 48, wherein said network comprises the Internet, said first remote server comprises a web server and said first software program is downloaded via a website controlled by said web server.

51. A method for transporting over a network, computer-based settings, files, and other data as per claim 48, wherein said network comprises an enterprise network and said first remote server comprises an enterprise server.

52. A method for transporting over a network, computer-based settings, files, and other data as per claim 48, wherein said first software program utilizes at least a first directive file, in extended markup language format and creates a second directive file, in extended markup language format.

53. A method for transporting over a network, computer-based settings, files, and other data as per claim 52, wherein said first and second directive files are created using the following:
   said first software program issuing a command to said first remote server;
   said first remote server querying a database server regarding information on where to collect at least said settings on said first computer-based device;
   said database server sending a resultant set containing said information on where to collect settings, files and other data to said first remote server;
   said remote server converting said resultant set into a data stream of XML tags thereby creating said first directive;
   said first software program gathering said settings, files, and other data by parsing said first directive file, and
   creating said second directive file, in XML format, by encapsulating said gathered settings, files, and other data.

54. A method for transporting over a network, computer-based settings, files, and other data as per claim 53, wherein said querying said database server further comprises:
   running an active server page (ASP) on said first remote server, and
   creating an active data object (ADO) to transfer data regarding location of settings in said first computer-based device.

55. A method for transporting over a network, computer-based settings, files, and other data as per claim 53, wherein said issued command is a HTTP POST command.

56. A method for transporting over a network, computer-based settings, files, and other data as per claim 53, wherein said downloading said first directive file with settings information in XML tag format onto said second computer-based device is accomplished via an HTTP POST command.

57. A method for transporting over a network, computer-based settings, files, and other data as per claim 53, wherein said parsing said first or second directive files is accomplished via an XML parser.

58. A method for transporting over a network, computer-based settings, files, and other data as per claim 48, further comprising undoing said installed settings and returning to original settings upon receiving an undo command.

59. A method for transporting over a network, computer-based settings, files, and other data as per claim 48, wherein said first software program comprises a C++ plug-in.

60. A method for transporting over a network, computer-based settings, files, and other data as per claim 48, wherein said first software program further includes ActiveX support.

61. A method for transporting over a network, computer-based settings, files, and other data as per claim 48, wherein said executed routines are Javascript routines.

62. A method for transporting over a network, computer-based settings, files, and other data as per claim 48, wherein said user interface is a set of HTML pages.

63. A method for transporting over a network, computer-based settings, files, and other data as per claim 48, wherein said first or second computer-based devices include any of the following: personal computer systems, laptops, portable computers, net devices, palm computers, or Web and WAP phones.

64. A system for transferring specified computer settings between one or more clients and one or more servers across the Internet, said system comprising:
- one or more web application servers, at least one of said web application servers operatively controlling a first website;
- one or more binary data servers operatively connected to said one or more web application servers;
- one or more database servers operatively connected to said one or more web application servers, and
- a client program downloaded to said client from said first website, said client program collecting and returning to said one or more binary data servers said specified computer settings based on parsed and executed XML directives originating from said database server and transferred to said client from said website, wherein said settings comprise hardware settings, system settings, attached device settings, application settings, document settings, desktop settings, files, data, e-mail settings, address book settings, bookmarks, and cookies.

65. A system for transferring specified computer settings between one or more clients and one or more servers across the Internet, as per claim 64, wherein said client program comprises one or more of: an ATL DLL core module, web call module, file transfer module, and browser interface.

66. A system for transferring specified computer settings between one or more clients and one or more servers across the Internet, as per claim 65, wherein said XML directives are replaced with SGML or HTML directives.

67. A system for transferring specified computer settings between one or more clients and one or more servers across the Internet, as per claim 65, wherein said parsed and executed XML based directive(s) enable an intelligent subset selection of available client settings, files or data.

68. A system for transferring specified computer settings between one or more clients and one or more servers across the Internet, as per claim 65, wherein said clients include any of the following: personal computer systems, laptops, portable computers, net devices, palm computers, or Web and WAP phones.

69. A method for transporting over an HTTP network, computer-based settings, said method performed using one or more remote servers located within said HTTP network, said method comprising:
- downloading from a first of said one or more remote servers a software plug-in to a computer-based device requesting transfer of said computer-based settings, wherein said settings comprise hardware settings, system settings, attached device settings, application settings, document settings, desktop settings, files, data, e-mail settings, address book settings, bookmarks, and cookies;
- using said first software plug-in to execute routines in conjunction with said first remote server to transfer said settings across said HTTP-based network.

* * * * *